United States Patent
Michie, Jr. et al.

(10) Patent No.: US 8,920,891 B2
(45) Date of Patent: Dec. 30, 2014

(54) RHEOLOGY MODIFIED RELATIVELY HIGH MELT STRENGTH POLYETHYLENE COMPOSITIONS AND METHODS OF MAKING PIPES, FILMS, SHEETS, AND BLOW-MOLDED ARTICLES

(75) Inventors: William J. Michie, Jr., Missouri City, TX (US); Dane Chang, Sugarland, TX (US); Anthony C. Neubauer, Piscataway, NJ (US); Mridula Kapur, Lake Jackson, TX (US); Todd A. Hogan, Sanford, MI (US); Felipe B. Martinez, Houston, TX (US); Stephane Costeux, Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 1294 days.

(21) Appl. No.: 11/721,388

(22) PCT Filed: Dec. 9, 2005

(86) PCT No.: PCT/US2005/044643
§ 371 (c)(1),
(2), (4) Date: Jun. 11, 2007

(87) PCT Pub. No.: WO2006/065651
PCT Pub. Date: Jun. 22, 2006

(65) Prior Publication Data
US 2009/0246433 A1     Oct. 1, 2009

Related U.S. Application Data

(60) Provisional application No. 60/637,105, filed on Dec. 17, 2004.

(51) Int. Cl.
*C08J 9/20* (2006.01)
*C08K 5/43* (2006.01)
*C08L 23/08* (2006.01)

(52) U.S. Cl.
CPC .............. *C08K 5/43* (2013.01); *C08L 23/0807* (2013.01); *C08L 2205/02* (2013.01)
USPC .............. 428/35.7; 521/60; 521/134; 521/79; 525/194; 525/197; 525/212; 525/240

(58) Field of Classification Search
USPC .............. 521/60, 134, 79; 525/194, 197, 212, 525/240; 428/35.7, 35.6
See application file for complete search history.

(56) References Cited

U.S. PATENT DOCUMENTS 4,663,360 A   5/1987   Park et al.
4,681,715 A   7/1987   Park et al.
(Continued)

FOREIGN PATENT DOCUMENTS

EP   0552563 A2   7/1993
EP   0685523 A1   12/1995
(Continued)

*Primary Examiner* — Ellen S Wood

(57) ABSTRACT

A polymer composition comprises a low-molecular-weight (LMW) ethylene polymer component and a high-molecular-weight (HMW) ethylene polymer component coupled with a polysulfonyl azide. Preferably, the LMW polyethylene component and the HMW polyethylene component co-crystallize in the composition such that it exhibits a single or substantially single peak in a lamella thickness distribution (LTD) curve. The ethylene polymer for the LMW and the HMW polyethylene components can be either homopolymer or ethylene copolymer. Preferably, both components are an ethylene copolymer of the same, or different, composition (that is, with the same or different comonomers). A method of making a pipe that includes selecting a polymer composition having a substantially single peak in the LTD curve is described. Compositions comprising a chromium-catalyzed ethylene polymer, coupled with a polysulfonyl azide are also described herein.

23 Claims, 3 Drawing Sheets

(56) References Cited

U.S. PATENT DOCUMENTS

| | | |
|---|---|---|
| 4,694,025 A | 9/1987 | Park |
| 4,714,716 A | 12/1987 | Park |
| 4,762,860 A | 8/1988 | Park |
| 4,935,164 A | 6/1990 | Wessling et al. |
| 4,981,760 A | 1/1991 | Naito et al. |
| 5,342,887 A | 8/1994 | Bergstrom et al. |
| 5,728,355 A | 3/1998 | Asada |
| 5,739,266 A | 4/1998 | Piana |
| 5,869,591 A | 2/1999 | McKay et al. |
| 5,977,271 A | 11/1999 | McKay et al. |
| 5,986,009 A | 11/1999 | Thoen et al. |
| 6,111,020 A | 8/2000 | Oriani et al. |
| 6,117,918 A | 9/2000 | Chaudhary et al. |
| 6,143,829 A | 11/2000 | Babb et al. |
| 6,147,167 A | 11/2000 | Mack et al. |
| 6,160,029 A | 12/2000 | Chaudhary et al. |
| 6,211,302 B1 | 4/2001 | Ho et al. |
| 6,227,916 B1 | 5/2001 | Wu |
| 6,248,840 B1 | 6/2001 | Sukhadia et al. |
| 6,284,842 B1 | 9/2001 | Ho et al. |
| 6,291,618 B1 | 9/2001 | Silvis et al. |
| 6,325,956 B2 | 12/2001 | Chaudhary et al. |
| 6,359,073 B1 | 3/2002 | Babb et al. |
| 6,376,623 B1 | 4/2002 | Hoenig et al. |
| 6,395,791 B1 * | 5/2002 | Chaudhary et al. ............ 521/60 |
| 6,417,242 B1 | 7/2002 | Hughes et al. |
| 6,433,103 B1 | 8/2002 | Guenther et al. |
| 6,454,976 B1 | 9/2002 | Neubauer |
| 6,458,911 B1 | 10/2002 | Ong et al. |
| 6,472,473 B1 | 10/2002 | Ansems et al. |
| 6,485,662 B1 | 11/2002 | Neubauer et al. |
| 6,506,848 B2 | 1/2003 | Hoenig et al. |
| 6,691,569 B1 | 2/2004 | Sentmanat |
| 6,767,931 B2 | 7/2004 | Martinez et al. |
| 6,776,924 B2 | 8/2004 | Walters et al. |
| 6,878,454 B1 | 4/2005 | Shannon et al. |
| 2001/0002075 A1 | 5/2001 | Chaudhary et al. |
| 2001/0046606 A1 | 11/2001 | Tau et al. |
| 2002/0052450 A1 | 5/2002 | Walters et al. |
| 2002/0061945 A1 | 5/2002 | Oates et al. |
| 2002/0064653 A1 | 5/2002 | Ladika et al. |
| 2002/0074682 A1 | 6/2002 | Neubauer |
| 2002/0077379 A1 | 6/2002 | Hughes et al. |
| 2002/0091199 A1 | 7/2002 | Babb et al. |
| 2002/0123573 A1 | 9/2002 | Hoenig et al. |
| 2002/0151609 A1 | 10/2002 | Chaudhary et al. |
| 2002/0151611 A1 | 10/2002 | Thoen et al. |
| 2002/0156193 A1 | 10/2002 | Tau et al. |
| 2004/0039131 A1 | 2/2004 | Wagner et al. |
| 2004/0154168 A1 | 8/2004 | McDonald |
| 2005/0012235 A1 | 1/2005 | Schregenberger et al. |
| 2005/0038200 A1 | 2/2005 | Borve et al. |
| 2005/0119426 A1 | 6/2005 | Roger et al. |
| 2005/0153148 A1 | 7/2005 | Shannon et al. |
| 2005/0154168 A1 | 7/2005 | Shannon et al. |

FOREIGN PATENT DOCUMENTS

| | | |
|---|---|---|
| EP | 0700769 A2 | 3/1996 |
| EP | 0870803 A1 | 10/1998 |
| EP | 0936049 A2 | 8/1999 |
| EP | 1007583 A1 | 6/2000 |
| EP | 1007591 A1 | 6/2000 |
| EP | 1423466 A1 | 6/2004 |
| EP | 1461197 A1 | 9/2004 |
| EP | 1517926 A1 | 3/2005 |
| WO | WO-9910395 A1 | 3/1999 |
| WO | WO-9910421 A1 | 3/1999 |
| WO | WO-9910423 A1 | 3/1999 |
| WO | WO-9910425 A1 | 3/1999 |
| WO | WO-0052091 A1 | 9/2000 |
| WO | WO-0078861 A1 | 12/2000 |
| WO | WO-0166632 A1 | 9/2001 |
| WO | WO-02068530 A2 | 9/2002 |
| WO | WO-03010815 A2 | 2/2003 |
| WO | WO-03047839 A1 | 6/2003 |
| WO | WO-03/102075 A1 | 12/2003 |
| WO | WO03102075 * | 12/2003 |
| WO | WO-2004101674 A1 | 11/2004 |
| WO | WO-2005061561 A1 | 7/2005 |
| WO | WO-2006065651 A2 | 6/2006 |

* cited by examiner

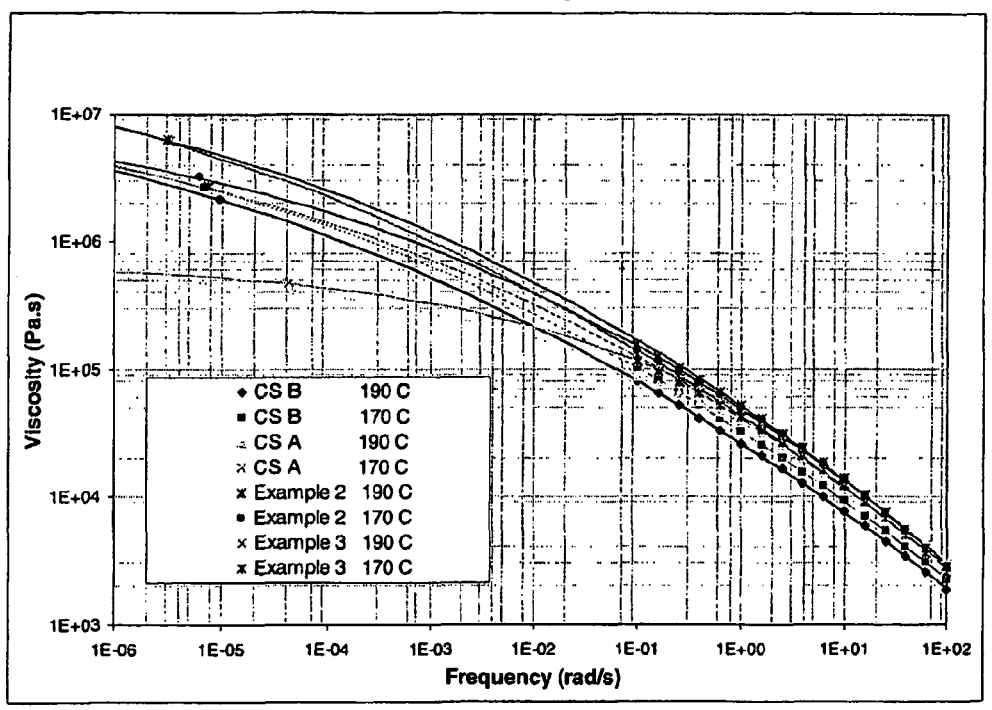
Figure 1: Low Shear Viscosity Characterization of Inventive and Comparative Example Samples

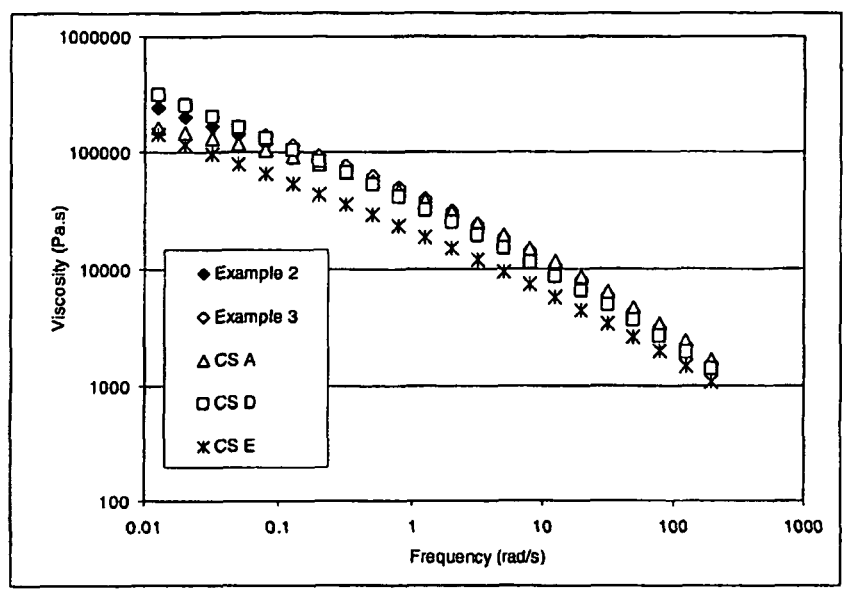
FIG. 2 Low Shear Viscosity Comparison

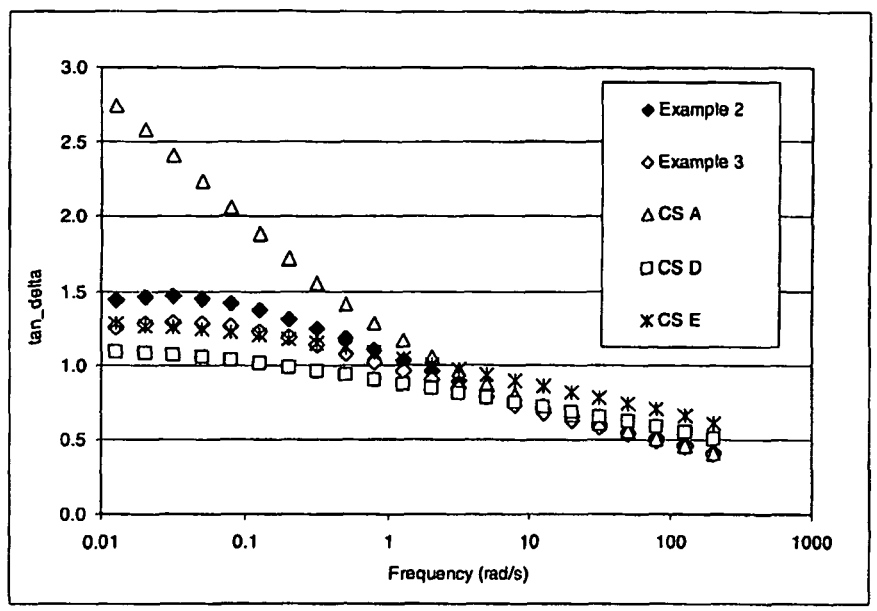
FIG. 3 Tan Delta Comparison

RHEOLOGY MODIFIED RELATIVELY HIGH MELT STRENGTH POLYETHYLENE COMPOSITIONS AND METHODS OF MAKING PIPES, FILMS, SHEETS, AND BLOW-MOLDED ARTICLES

This application claims the benefit of U.S. Provisional Application No. 60/637,105, filed on Dec. 17, 2004, incorporated herein, in its entirety, by reference.

This invention relates to coupling of relatively high melt strength polyethylenes, more specifically coupling of relatively high melt strength polyethylenes for use in forming pipes, blown films, sheets, tapes, fibers, and molded articles such as compression molded, injection molded and blow molded articles.

Polyethylene pipes are light in weight, easy to handle, and are non-corrosive. In addition, their rigidity is relatively high so that they can be laid under the ground, yet their flexibility is such that they can follow ground contours and accommodate earth movements. Due to these advantageous characteristics, the amount of polyethylene pipes used is rapidly increasing in recent years.

In addition to the above desirable characteristics, polyethylene pipes should have (1) impact resistance sufficient to endure impacts given at the time when and after they are installed; and (2) excellent long-term durability under gas or water pressure (specifically, environmental stress cracking resistance, slow crack growth, rapid crack propagation, and internal pressure creep resistance). Further, in the manufacture of the pipes, the pipe resin must exhibit excellent sag resistance from gravity flow for successful extrusion of large diameter heavy wall pipe with minimum wall thickness eccentricity. Likewise, film resins need to exhibit an improved balance of extrudability, bubble stability, dart drop, and FAR (Film Appearance Rating), while being able to be successfully extruded at all commercially required line speeds. Resins for blow molded articles need to provide sag resistance and a good balance of stiffness and ESCR (Environmental Stress Crack Resistance). Thermoformed sheets also need resins that provide good sag resistance and extensibility. Such resin properties are also desirable in other applications.

High-molecular-weight (HMW) ethylene homopolymers and copolymers typically exhibit improved strength and mechanical properties, including high tensile strength, impact strength and puncture resistance. However, attendant with such increases are difficulties in processability and extrudability of these HMW resins. One approach to solve this problem has been to broaden the molecular weight distribution (MWD) of the HMW polyethylene. One method to achieve this is by catalyst selection, for instance, it is known that chromium catalysts tend to produce a product with broader molecular weight distribution than either traditional Ziegler-Natta (Z-N) or the newer metallocene-based catalyst systems.

Another method used to overcome the processing difficulties associated with HMW polyethylene has been to increase the MWD of the polymer by providing a blend of a HMW polymer with a low-molecular-weight (LMW) polymer. The goal of such a formulation is to retain the excellent mechanical properties of the high molecular weight polyethylene, while also providing improvements in processability, resulting from the improved extrudability of the lower molecular weight component. For example, U.S. Pat. No. 6,458,911 and U.S. 2002/0042472 A1 disclose a bimodal ethylene polymer film resin comprising a polymer blend, of a LMW component and a HMW component. The blends are said to be capable of being formed into high strength thin films.

High melt strength polymer compositions, comprising a blend of HMW and LMW polyethylenes, have been developed that are suitable for use in pipe and film applications, as disclosed in U.S. 2003/0065097, incorporated herein by reference. Although these compositions have high melt strengths, higher melt viscosities at very low shear rates are still desirable.

Higher melt viscosities can be achieved by rheology modification techniques. As used herein, the term "rheology modification" means change in melt viscosity of a polymer, as determined by creep measurements and dynamic mechanical spectroscopy (DMS). Preferably the polymer melt strength or viscosity at low shear rates increases, while maintaining the polymer viscosity at high shear rates. Thus, the rheology modified polymer exhibits more resistance to gravity flow, sagging, or stretching, during elongation of molten polymer at low shear conditions (that is viscosity measured at a shear of less than 0.1 rad/s by DMS or creep measurements), and does not sacrifice the output at high (that is approximately 10 rad/s and greater) shear conditions. An increase in melt strength is typically observed when high molecular weight species, long chain branches or similar structures are introduced into a polymer.

Polyolefins are frequently rheology modified using nonselective chemistries involving free radicals generated, for instance, using peroxides or high energy radiation. However, chemistries involving free radical generation at elevated temperatures also degrade the molecular weight, through chain scission, especially in polymers containing tertiary hydrogen, such as polystyrene, polypropylene, polyethylene copolymers, etc. Another technique for rheology modification, is achieved by coupling polymer chains together by means of reaction with polysulfonyl azides, as taught, for example, in U.S. Pat. Nos. 6,143,829, 6,160,029, 6,359,073, and 6,379,623.

A relatively high melt strength polymer composition is coupled with a polysulfonyl azide, in order to obtain articles with further improved melt strength characteristics. This novel high melt strength polymer composition comprises a LMW polyethylene component and a HMW polyethylene component, wherein the polymer composition has a substantially single peak in an Lamella Thickness Distribution (LTD) curve, and a PENT (Pennsylvania Notch Test) value of greater than approximately 1,000 hours, characterized per ASTM D-1473-97, at about 80° C., and approximately 2.4 MPa. The novel resin composition, when fabricated in the form of pipe meets and exceeds the industry's PE 3408 and PE 100 requirements. The novel resin composition may be used as a direct (drop-in) replacement for resins currently used in conventional pipe manufacturing processes, and can be formed into all pipe diameter and wall thickness combinations, commonly found in the industry. When the novel resin is fabricated into film, a high dart impact (per ASTM D-1709-03 Method B) resistant film results with good extrudability, and bubble stability, processability and high film appearance rating (FAR). Blow molded articles with improved properties can be made from the novel resin composition due to its combination of high melt strength and sag resistance (characterized by viscosity measured at a shear rate of less than 0.1 rad/s by Dynamic Mechanical Spectroscopy (DMS) or creep measurements, and excellent balance between stiffness (characterized by density, flex modulus, and 2 percent secant modulus per ASTM D-790-03 Method B), ESCR (characterized by ASTM D-1693-01 Method B), and impact resistance (characterized by ASTM D-256-03 Method A and ASTM D-1822-99).

In particular, the invention provides a composition, comprising the reaction product of:

(a) a first composition comprising a LMW polyethylene component; and a HMW polyethylene component, and (b) a second composition comprising a coupling amount of at least one polysulfonyl azide, and wherein the first composition has a substantially single peak in an LTD curve, and wherein the composition has a PENT value of greater than 1,000 hours at 80° C., and at an applied stress of about 2.4 MPa.

In one embodiment, the composition has a PENT value of greater than 3,000 hours, and preferably greater than 6,500 hours at about 80° C. and about 3 MPa.

In another embodiment, the composition has a density greater than about 0.940 g/cc, an average molecular weight ranging from 200,000 to 490,000 g/mol, and a flow rate ratio $(I_{21}/I_5)$ from 15 to 50;

In yet another embodiment, the HMW polyethylene component includes a comonomer selected from the group consisting of $C_3$ to $C_{10}$ alpha-olefins, and in particular, $C_3$ to $C_{10}$ aliphatic alpha-olefins. In a further embodiment, the comonomer content ranges from greater than 0 to 6.0 weight percent, including all individual values and subranges from 0 to 6.0 weight percent.

In another embodiment, the LMW polyethylene component includes a comonomer selected from the group consisting of $C_3$ to $C_{10}$ alpha-olefins, and in particular, $C_3$ to $C_{10}$ aliphatic alpha-olefins. In yet a further embodiment, the comonomer content ranges from greater than 0 to 3.0 weight percent, including all individual values and subranges from 0 to 3.0 weight percent.

In another embodiment, first composition is bimodal, or multimodal, as determined by GPC.

In another embodiment, the HMW polyethylene component comprises from 48 to 67 percent, by weight, of the combined weight of the HMW component and the LMW component. In yet another embodiment, the LMW polyethylene component comprises from 33 to 52 percent, by weight, of the combined weight of the HMW component and the LMW component.

In another embodiment, the composition has the following properties:
1) a density of at least 0.94 g/cc as measured by ASTM Method D-792-03 Method B;
2) a melt flow rate $(I_5)$ from 0.2 to 1.5 g/10 min;
3) a flow rate ratio $(I_{21}/I_5)$ from 20 to 50; and
4) a molecular weight distribution, $M_w/M_n$, from 15 to 40; and wherein the HMW polyethylene component comprises from 30 to 70 weight percent of the composition; has a density of at least 0.89 g/cc, as measured by ASTM D-792-03 Method B; has a melt flow rate $(I_2)$ from 0.01 to 0.2 g/10 min and a flow rate ratio $(I_{21}/I_2)$ from 20 to 65; and wherein the LMW polyethylene component comprises from 30 to 70 weight percent of the composition; has a density of at least 0.940 g/cc, as measured by ASTM D-792-03 Method B; has a melt flow rate $(I_2)$ from 40 to 2,000 g/10 min; and has a flow rate ratio $(I_{21}/I_2)$ from 10 to 65.

In another embodiment, the concentration of polysulfonyl azide is up to 200 µg/g, and more preferably less than 200 µg/g.

The invention also provides for compositions comprising combinations of two or more embodiments as described herein.

The invention also provides for an article, comprising at least one component formed from a composition of the invention. Such an article includes, but is not limited to, blow molded articles, pipes, films, sheets and other articles.

In one embodiment, the invention provides a pipe with a wall thickness of up to 4 inches (10.2 cm), or more. In another embodiment, the invention provides a pipe with a wall thickness of less than 4 inches (10.2 cm).

In another embodiment, the invention provides a film prepared from a composition that is coupled with less than 150 µg/g polysulfonyl azide. In another embodiment, the invention provides a film that has a higher dart impact strength, than a film made from an otherwise identical polymer composition that lacks a coupling agent. In a further embodiment, the invention provides a film that has a greater side-to-side bubble stability, than a film made from an otherwise identical polymer composition that lacks a coupling agent. In yet a further embodiment, the invention provides a film that has both a higher dart impact strength and a greater side-to-side bubble stability, than a film made from an otherwise identical polymer composition that lacks a coupling agent.

In another embodiment, the invention provides a blow molded article that has higher tensile impact and Izod impact values, and at least equal ESCR values, than a blow molded article made from an otherwise identical polymer composition that lacks a coupling agent. In a further embodiment, the blow molded article is a bottle, drum, or automotive part.

The invention also provides a method of making a pipe, comprising:
a) selecting a polymer composition having a substantially single peak in an LTD curve;
b) coupling the polymer composition with a polysulfonyl azide; and
c) extruding the polymer composition to form the pipe.

The invention also provides a method to improve the creep flow behavior of a resin, the method comprising reacting a polysulfonyl aside with a composition that comprises a LMW polyethylene component and a HMW polyethylene component, and wherein the composition has a substantially single peak in an LTD curve, and wherein the reacted composition has a PENT value of greater than 1,000 hours at 80° C. and at an applied stress of 2.4 MPa. In a further embodiment of this method, the composition, after the coupling reaction, has a melt viscosity, at a shear rate of $1 \times 10^{-5}$ rad/s, that is 2-fold greater than a melt viscosity of the polymer resin composition at the same shear rate. In yet a further embodiment of this method, the composition, after the coupling reaction, has a melt viscosity, at a shear rate of $1 \times 10^{-5}$ rad/s, that is 5-fold greater than a melt viscosity of the polymer resin composition at the same shear rate. In yet a further embodiment of this method, the composition, after the coupling reaction, has a melt viscosity, at a shear rate of $1 \times 10^{-5}$ rad/s, that is 10-fold, or more, greater than a melt viscosity of the polymer resin composition at the same shear rate.

The invention also provides a composition, comprising the reaction product of:

(a) a first composition comprising a polyethylene component prepared in the presence of a chromium-based catalyst system, and (b) a second composition comprising a coupling amount of at least one polysulfonyl azide.

In one embodiment of this composition, the polyethylene component is unimodal as determined by GPC. In another embodiment, the polyethylene component has a density from 0.890 to 0.975 g/cc, and preferably a density from 0.930 to 0.960 g/cc. In yet another embodiment, the polyethylene component has a MI2 from 0.01 to 20 g/10 min, and more preferably from 0.1 to 15 g/10 min. In another embodiment, the polyethylene component has a MI21 from 1 to 50 g/10 min, and an MI21/MI2 from 4 to 200. In yet another embodiment, the polyethylene component has polymerized therein a comonomer selected from the group consisting of $C_3$ to $C_{10}$ alpha-olefins, and in particular, $C_3$ to $C_{10}$ aliphatic alpha-olefins. In another embodiment, the comonomer is selected from the group consisting of propylene, 1-butene, 1-pentene, 1-hexene, 1-heptene and 1-octene, and more preferably the comonomer is selected from the group consisting of 1-hexene and 1-octene. In another embodiment of this composition, the composition has a gel content that is less than 10 percent, preferably less than 5 percent, more preferably less than 2 percent, and even more preferably less than 0.5 percent, as measured according to ASTM D 2765-90. In yet another embodiment, the composition is coupled with less than 200 µg/g of polysulfonyl azide. The invention also provides for compositions comprising combinations of two or more embodiments as described herein. The invention also provides for articles comprising at least one component formed from such a composition, including, but not limited to, sheets, such as thermoformed sheets, films, pipes, blow molded articles and other articles. Such a composition is especially suited for thermoformed sheets.

FIG. 1 depicts low shear viscosity profiles of inventive and comparative resins.

FIG. 2 depicts low shear viscosity profiles of inventive and comparative resins.

FIG. 3 depicts tan delta profiles of inventive and comparative resins.

Embodiments of the invention provide a new polyethylene composition for making water, oil, or gas pipes, and other products, such as sheet, film, tapes, fibers, caps and closures, and molded articles by molding processes, including blow molding, compression molding, and injection molding.

Embodiments of the invention provide a method of making water, oil, or gas pipes. The method includes selecting a polymer composition having a substantially single peak in an LTD curve and extruding the composition to form a pipe.

The new composition comprises a LMW ethylene polymer component and a HMW ethylene polymer component. Preferably, the LMW component and the HMW component co-crystallize in the composition, such that it exhibits a single or substantially single peak in an LTD curve. The ethylene polymer for the LMW and the HMW components can be either homopolymers or ethylene interpolymers (or copolymers). Preferably, both components are ethylene interpolymers (or copolymers) of the same or different composition (that is, with the same or different comonomers). The bimodality of the MWD of the new composition is due to the difference in the MW of the LMW component and the HMW component. The individual components preferably have a unimodal MWD. Preferably, the molecular weights of the LMW and HMW components, individually, are different and distinct from each other, such that, when mixed, the resulting composition has an overall bimodal molecular weight distribution. Multimodal MWD resins may also be used.

Preferred comonomers used in the polyethylene components of the invention include C3-C20 aliphatic alpha-olefins, and more preferably C3-C10 aliphatic alpha-olefins. Preferable the comonomer is selected from the group consisting of propylene, 1-butene, 1-pentene, 1-hexene, 1-heptene, 1-octene, 1-nonene, 1-decene and 4-methyl-1-pentene. Particularly preferred comonomers are selected from the group consisting of propylene, 1-butene, 1-hexene, and 1-octene, and more preferably from 1-hexene and 1-octene. In another embodiment, the polyethylene component may also contain at least one polyene, including, but not limited to, conjugated and nonconjugated dienes.

In the following description, all numbers disclosed herein are approximate values, regardless whether the word "about" or "approximate" is used in connection therewith. They may vary by 1 percent, 2 percent, 5 percent, and sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent, with a 1 percent increment, that is, k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers, as defined in the above, is also specifically disclosed. Numerical ranges for melt indexes, density, molecular weight, number of carbon atoms in an alpha-olefin, and other properties have been described herein.

The term "coupling amount," as used herein, refers to an amount of coupling agent that is effective in coupling polymer chains, but that does not result in the significant crosslinking of the final polymer product, as evident by very low or no gel content in the final polymer product.

The term "polymer" is used herein to indicate, a homopolymer, an interpolymer (or copolymer), or a terpolymer. The term "polymer," as used herein, includes interpolymers, such as, for example, those made by the copolymerization of ethylene with one or more $C_3$-$C_{10}$ alpha olefin(s) or polypropylene with one or more $C_4$-$C_{10}$ alpha olefin(s).

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene/α-olefin," "ethylene interpolymer (or copolymer)," and similar terms, as used herein, refers to an ethylene-based interpolymer that contains at least 50 mole percent ethylene, and one or more additional comonomers.

The term "unimodal," as used herein, in reference to the overall MWD of comparative examples, or in reference to the MWD of a component polymer of the inventive composition, means the MWD in a Gel Permeation Chromatography (GPC) curve does not substantially exhibit multiple component polymers, that is, no humps, shoulders or tails exist, or are substantially discernible, in the GPC curve. In other words, the DOS (Degree of Separation) is zero or substantially close to zero.

The term "bimodal," as used herein, means that the MWD in a GPC curve exhibits two component polymers, wherein one component polymer may even exist as a hump, shoulder or tail, relative to the MWD of the other component polymer.

The term "multimodal" as used herein means that the MWD in a GPC curve exhibits more than two component polymers, wherein one component polymer may even exist as a hump, shoulder or tail, relative to the MWD of the other component polymer.

The term "distinct," as used in reference to the MWD of the LMW component and the HMW component, means there is no substantial overlapping of the two corresponding molecular weight distributions in the resulting GPC curve. That is, each molecular weight distribution is sufficiently narrow, and their average molecular weights are sufficiently different, that the MWD of both components substantially exhibits a baseline on its HMW side as well as on its LMW side. In other words, the DOS is at least 1, preferably at least 2, 4, 5, 7, 9, or 10.

The term LTD, used herein, refers to the distribution of the lamella thickness, Lc, of a polymer.

The term "substantially singular peak" is used herein with reference to LTD curves to mean that a peak does not substantially exhibit two or more peaks. But a "substantially single peak" may not follow a Gaussian distribution, may be broader than a Gaussian distribution would indicate, or have a flatter peak than a Gaussian distribution. Some substantially singular peaks may have a tail on either side of the peak. In some embodiments, it may be possible to mathematically resolve a "substantially single peak" in an LTD curve into two or more components by various methods. In some embodiments a "substantially single peak" in an LTD curve follows the equation:

$$\frac{P_H - P_L}{P_i} \times 100\% \le 10\%, \quad (1)$$

where $P_i$ is a point in the LTD curve having a value for the percent weight fraction between that of the highest weight fraction value, $P_H$, of the LTD trace, and the lowest point, $P_L$, having an Lc value between the Lc value of $P_i$ and the Lc value of $P_H$. In some instances, this percent difference is less than approximately 8 percent, or less than approximately 7 percent. In some embodiments a substantially single peak has a difference of approximately 5 percent or less or approximately 2.5 percent or less. Of course in some embodiments, there is no point $P_L$ between $P_i$ and $P_H$ so the percent difference is zero.

As used herein, the term "rheology modification" means change in melt viscosity of a polymer as determined by creep measurements and DMS.

The term "catalyst precursor," as used herein, in particular reference to magnesium/titanium type catalysts, means a mixture comprising titanium and magnesium compounds and a Lewis Base electron donor.

The term "inertly substituted" refers to substitution with atoms or groups which do not undesirably interfere with the desired reaction(s) or desired properties of the resulting coupled polymers.

For purposes of the present disclosure, the reactor, in which the conditions are conducive to making a high molecular weight polymer, is known as the "high molecular weight reactor." Alternatively, the reactor in which the conditions are conducive to making a low molecular weight polymer is known as the "low molecular weight reactor."

The term "melt processing" is used to mean any process in which the polymer is softened or melted, including, but not limited to, extrusion, pelletizing, film blowing and casting, thermoforming, compounding in polymer melt form.

The term "extruder" is used for its broadest meaning to include such devices, as a device which extrudes pellets or pelletizer.

The terms "blend" or "polymer blend," or similar terms, as used herein, mean a blend of two or more polymers. Such a blend may or may not be miscible. Such a blend may or may not be phase separated. Such a blend may or may not contain one or more domain configurations, as determined from transmission electron microscopy.

Resin density was measured by the Archimedes displacement method, ASTM D 792-03, Method B, in isopropanol. Specimens were measured within 1 hour of molding after conditioning in an isopropanol bath at 23° C. for 8 min, to achieve thermal equilibrium prior to measurement. The specimens were compression molded according to ASTM D4703-00 Annex A, with a 5 min initial heating period at approximately 190° C., and a 15° C./min cooling rate per Procedure C. The specimen was cooled to 45° C. in the press with continued cooling until "cool to the touch."

Melt flow rate measurements were performed according to ASTM D-1238-03, Condition 190° C./2.16 kg and Condition 190° C./5.0 kg, which are known as $I_2$ and $I_5$, respectively. Melt flow rate is inversely proportional to the molecular weight of the polymer. Thus, the higher the molecular weight, the lower the melt flow rate, although the relationship is not linear. Melt flow rate determinations can also be performed with even higher weights, such as in accordance with ASTM D-1238, Condition 190° C./10.0 kg and Condition 190° C./21.6 kg, and are known as $I_{10}$ and $I_{21}$, respectively. Flow Rate Ratio (FRR) is the ratio of melt flow rate ($I_{21}$) to melt flow rate ($I_2$) unless otherwise specified. For example, in some instances the FRR may be expressed as $I_{21}/I_5$, especially for higher molecular weight polymers.

The amount of polymer fines in a given sample was determined using the following method: 500 grams of polymer were added to a standard sieve set consisting of the following US mesh sizes: 10, 18, 35, 60, 120, 200 (2000 μm, 1000 μm, 500 μm, 250 μm, 125 μm, 75 μm) and pan. A Rotap or Gradex 2000 shaker was used to separate the particles. The materials which pass through the 120 mesh screen, and remain on the pan, are classified as fines. The geometric mean is used to calculate the particle average particle size (APS).

Bulk density of the polymer was determined using ASTM D1895-96 (re-approved 2003).

A FAR value was obtained by comparing the extruded film to a set of reference film standards, both at 1.5 mil (38 μm) thickness for the pipe and blow molding resins. The film resin was fabricated to 1 mil thickness (25 μm) and compared to the 1.5 mil (38 μm) film standards. The standards are available from The Dow Chemical Company (Test Method PEG #510 FAR). For all resins except film resins, the following method is used. The resin is stabilized prior to extrusion by thoroughly mixing 0.10, 0.05, and 0.08 weight percent, respectively, of the following additives into the resin: calcium stearate, zinc stearate, and a phenolic stabilizer, octadecyl 3,5-di-tert-butyl-4 hydroxyhydrocinnamate, commercially available from Ciba Specialty Chemicals under the trade designation Irganox 1076. A Model CE-150-20, 38 mm (1.5 in) 20:1 L/D, MPM Custom Equipment, electrically heated air-cooled extruder, with 7 heating zones (3 barrel, 1 gate, 3 die) was used to make the film specimens). A more detailed extruder description is as follows:

| | |
|---|---|
| Extruder Manufacturer: | MPM Polymer Systems, Inc. |
| Type: | Low Boy |
| | [610 mm (24 in) Center Line] |
| Heating: | Electrical 425° C. controllers |
| Cooling: | Only on hopper (water) |
| Speed: | Variable |
| Screw Manufacturer: | MPM Polymer Systems, Inc. |
| Type: | 20:1 standard low density polyethylene screw bored to midway of transition section. |
| Diameter: | 38 mm (1.5 in) |
| L to D: | 20/1 |
| Die Manufacturer: | MPM Polymer Systems, Inc. |

-continued

| | |
|---|---|
| Diameter: | 100 mm (4 in) |
| Gap: | 30 mil (0.762 μm) |
| Type: | Deep Side Fed |
| Blower Manufacturer: | Buffalo Forge |
| | Air flow control damper on suction |
| | Air flow control valving on discharge |
| Motor: | 1.5 hp (1120 W), 2 speeds |
| | Air equalizing chamber between blower and air |
| Air Ring Manufacturer: | MPM Polymer Systems, Inc. |
| Layout 708 | |
| Diameter: | 172 mm (6.75 in) I.D. |
| Type: | Adjustable lip |
| Tower Height: | 914 mm (36 in) |
| Collapsing Frame Length: | 343 mm (13.5 in) |
| The extrusion conditions for the FAR test were as follows: | |
| Screw | Neutral |
| Hopper | Water Full Flow |
| Temperatures (° C.) | |
| Zone 1 | 210 |
| Zone 2 | 210 |
| Zone 3 | 210 |
| Gate | 225 |
| Adapter | 225 |
| Die Zone 1 | 225 |
| Die Zone 2 | 225 |
| Screen Pack, stainless steel, mesh | 40/40 |
| Output: | |
| Screw Speed | 65 rpm |
| Blow up Ratio | 2/1 |
| Lay flat width | 12 in (304.8 mm) |
| Frost Line Height | 103 in (254 mm) |
| Tower Height | 36 in (914.4 mm) |
| Film Rating Test: | |
| Nip Roll Speed | 254 ft/min (1.29 m/s) |
| Film Gauge | 1.5 mil (0.038 μm) |
| Range for Film Gauge | 1.3-1.7 mil (33-43.2 μm) |

The screw speed can be adjusted to give proper throughput rates. Frost line was measured from the lower level of the air ring. The nip roll speed was varied until a film thickness of 1.5 mil (38 μm) was obtained. Film thickness was measured using a Federal dial indicator gauge according to ASTM D 374.

After the extruder had reached thermal equilibrium, and uniform film was being produced, a film sample of 3 m length was taken. Ratings were based upon the worst section viewed in each sample. This rating is based on the level of gels observed in the film, a general term for a discrete imperfection in polyethylene film. Gels may be formed from high molecular weight material, either clear or discolored, lint or other foreign contamination, or resin cross contamination. Gels are the most common defect encountered in films, and account for a large portion of the film rating. Other defects were noted but normally were not included in the film appearance value. If needed, reference is made to a set of high density film standards during this evaluation. The values given are in increments of 10 units, ranging from +50 (best) to −50 (worst).

All of the results reported here were generated via a TA Instruments Model Q1000 DSC, equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. Approximately 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C., and held isothermal for 3 minutes in order to remove any previous thermal history. The sample was then cooled to −40° C., at 10° C./min cooling rate, and was held at −40° C. for 3 minutes. The sample was then heated to 150° C. at 110° C./min heating rate. The cooling and second heating curves were recorded.

An LTD curve refers to a plot of the weight percent as a function of the lamellar thickness, Lc. Additional information can be found in U.S. Pat. No. 4,981,760 and U.S. 2004/0034169 A1, which are incorporated by reference herein in their entireties.

LTD data were obtained and analyzed in the following manner. Samples were cut directly from the fabricated polyethylene products. DSC samples were taken from the pipe wall, film, or plaques used for PENT measurements. Samples can also be taken from the pellets to gain an insight into the effect of pelletizing conditions on LTD. If the fabrication process did not yield a uniform cooling/solidification profile, samples were taken from different parts of the product to reflect these differences. This may be important in extruded pipes, if the pipe was cooled from the outside to the inside by cold water, such that the cooling rate therefore decreased from the outside to the inside of the pipe wall. To reflect these differences, at least three samples were taken from the outside, middle and inside layer of the pipe wall. About 10 mg of sample was analyzed by DSC using a heating rate of 10° C./min. To better compare the differences caused by molecular variables, the solidification history of the sample was standardized as follows: The specimen was recrystallized by melting the specimen in the DSC sample holder at 190° C., and then cooling it down to 30° C., at the rate of 20° C./min, to eliminate artifacts in the DSC curve that might otherwise be observed due to previous fabrication processes.

A three step procedure was used. First, the LTD in products, such as pipes or film, was determined by scanning the sample from 30° C. to 190° C., at the heating rate of 10° C./min. The characteristic of the resultant LTD is associated with both the material variables and the processing condition. The sample was maintained at 190° C. for 1 minute to completely relax the molecular chains. Second, the sample was cooled at the cooling rate of 20° C./min from 190° C. to 30° C., to allow the sample to re-crystallize under controlled conditions. The temperature was maintained at 30° C. for 1 minute. Third, the sample was heated at a rate of 10° C./min to determine LTD in the re-crystallized sample. This LTD is used to investigate the effect of material variables by eliminating the fabrication factors. First, the DSC melting peak was integrated. The melting temperature and the corresponding integrated partial area of the melting peak were recorded. The melting temperature was then used to calculate the lamella thickness, l, of polyethylene crystal according to the well-known Thomson-Gibbs equation from the melting point, Tm.

$$T_m = T_m^* \left(1 - \frac{2\sigma_e}{\ell \cdot \Delta h_m}\right), \quad (1)$$

where $T_m^\circ$ is the equilibrium melting point of an infinite crystal, $\sigma_e$ is the surface free energy of the basal plane, and $\Delta h_m$ is the enthalpy of fusion per unit volume. In *Die Makro-*

*molekulare Chemie,* 1968, 113, 1-22, Illers and Hendus experimentally determined the constants in equation (1). The lamella thickness, Lc (nm), then can be calculated from the melting point, Tm (K), as follows:

$$L_c = \frac{0.62 - 414.2}{414.2 - T_m}. \qquad (2)$$

For a given melting temperature from the DSC melting peak, the corresponding lamella thickness was obtained from equation (2). Lamellar thickness distributions are also discussed in *Polymer,* vol. 38, issue 23 (1997) by Zhou, Hongi, and Wilkes, the disclosure of which is hereby incorporated by reference. The integrated partial area of the melting peak is used to calculate the differentiated weight percent of the crystal for a given lamella thickness. The partial area, $\Delta H_i$, of a DSC melting peak is assumed to be proportional to the weight percent of the lamella crystal within this partial area. The differentiated weight percent, wt percent, of the lamellae at the thickness Lc,i is therefore determined by equation (3), as follows:

$$\text{wt } \%(L_{c,i}) = \frac{d(\Delta H_i)/\Delta H_{total}}{d(L_c)}. \qquad (3)$$

The plot of the weight percent from the integrated partial area as a function of the lamella thickness gives the LTD curve. In addition, the total heat fusion of the melting peak can be used to determine the crystallinity. The detailed data analysis process is discussed in the following. Analysis of the LTD curve, obtained from the procedure described above, can be analogized to the analysis of (MWD) or polydispersity index (PDI) based on the weight (Mw) and number (Mn) average molecular weight, the thickness average, Lt, and number average, Ln, lamella thickness are therefore defined by equation (4) and (5), as follows:

$$L_t = \frac{\sum_{i=1}^{\infty} L_{c,i}^2 n_i}{\sum_{i=1}^{\infty} L_{c,i} n_i} = \sum_{i=1}^{\infty} L_{c,i} \Delta H_i / \Delta H, \qquad (4)$$

$$L_c = \frac{\sum_{i=1}^{\infty} L_{c,i} n_i}{\sum_{i=1}^{\infty} n_i} = \frac{1}{\sum_{i=1}^{\infty} \left(\frac{\Delta H_i}{\Delta H}\right)/L_{c,i}}. \qquad (5)$$

Similar to the polydispersity index (PDI=MWD=Mw/Mn) which gives information regarding the molecular weight distribution, the lamella dispersity index, LDI, is hence given by equation:

$$LDI = \frac{L_t}{L_n}. \qquad (6)$$

So LDI is a quantitative characteristic of the breadth of the LTD curve.

The following procedure was used to determine the molecular architecture of various polymer compositions. The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories.

The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min.

Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using equation 8 (as described in Williams and Ward, *J. Polym. Sci. Polym. Let.* 6, 621 (1968)):

$$M_{polyethylene} = A \times (M_{polystyrene})^B \qquad (8),$$

where M is the molecular weight, A has a value of 0.41 and B is equal to 1.0.

The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions,* Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2nd Virial coefficient effects (concentration effects on molecular weight).

Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (9) below:

$$a) \overline{Mn} = \frac{\sum_i Wf_i}{\sum_i (Wf_i / M_i)}$$

$$b) \overline{Mw} = \frac{\sum_i (Wf_i * M_i)}{\sum_i Wf_i}$$

$$c) \overline{Mz} = \frac{\sum_i (Wf_i * M_i^2)}{\sum_i (Wf_i * M_i)}$$

(9)

The term "bimodal," as used herein, means that the MWD in a GPC curve exhibits two component polymers, wherein one component polymer may even exist as a hump, shoulder or tail, relative to the MWD of the other component polymer. A bimodal MWD can be deconvoluted into two components: LMW component and HMW component. After deconvolution, the peak width at half maxima (WAHM) and the average molecular weight ($M_w$) of each component can be obtained. Then the degree of separation (DOS) between the two components can be calculated by equation 10, as follows:

$$DOS = \frac{\log(M_w^H) - \log(M_w^L)}{WAHM^H + WAHM^L},$$ (10)

wherein $M_w^H$ and $M_w^L$ are the respective weight average molecular weight of the HMW component and the LMW component; and $WAHM^H$ and $WAHM^L$ are the respective peak width at the half maxima of the deconvoluted molecular weight distribution curve for the HMW component and the LMW component. The DOS for the new composition is approximately 0.01 or higher. In some embodiments, DOS is higher than approximately 0.05, 0.1, 0.5, or 0.8. Preferably, DOS for the bimodal components is at least about 1 or higher. For example, DOS is at least 1.2, 1.5, 1.7, 2.0, 2.5, 3.0, 3.5, 4.0, 4.5, or 5.0. In some embodiments, DOS is between approximately 5.0 to approximately 100, between approximately 100 to 500, or between approximately 500 to 1,000. It should be noted that DOS can be any number in the above range. In other embodiments, DOS exceeds 1,000.

In some embodiments the bimodality of the distributions is characterized by the weight fraction of the highest temperature peak in temperature rising elution fractionation (typically abbreviated as "TREF") data as described, for example, in Wild et al., *Journal of Polymer Science. Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. The weight fraction corresponding to the highest temperature peak is referred to as the high-density fraction, since it contains little or no short chain branching. The remaining fraction is therefore referred to as the short chain branching (SCB) fraction, since it represents the fraction which contains nearly all the short-chain branching inherent to the polymer. This fraction is also the low density fraction.

In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column is equipped with both an infra-red detector and a differential viscometer (DV) detector. An ATREF-DV chromatogram curve is then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference. WO 99/14271 also describes a suitable deconvolution technique for multicomponent polymer blend compositions. The ATREF curve is also frequently called the short chain branching distribution (SCBD), since it indicates how evenly the comonomer (for example, hexene) is distributed throughout the sample, in that as elution temperature decreases, comonomer content increases. The refractive index detector provides the short chain distribution information, and the differential viscometer detector provides an estimate of the viscosity average molecular weight. A discussion of the preceding may be found in L. G. Hazlitt, *J. Appl. Polym. Sci.: Appl. Poly. Symp.*, 45, 25-37 (1990), which is incorporated herein by reference.

The resin swell was measured by the Dow Lab Swell method which consists of measuring the time required by an extruded polymer strand to travel a pre-determined distance of 230 mm. The Göttfert Rheograph 2003, with 12 mm barrel, and equipped with a 10 L/D capillary die was used for the measurement. The measurement was carried out at 190° C., at two fixed shear rates, 300 s$^{-1}$ and 1,000 s$^{-1}$, respectively. The more the resin swells, the slower the free strand end travels, and the longer it takes to cover 230 mm. The swell is reported as t300 and t1000 (s) values.

The sample was compression molded into a disk for rheology measurement. The disks were prepared by pressing the samples into 0.071" (1.8 mm) thick plaques, and which were subsequently cut into 1 in (25.4 mm) disks. The compression molding procedure was as follows: 365° F. (185° C.) for 5 min at 100 psi (689 kPa); 365° F. (185° C.) for 3 min at 1500 psi (10.3 MPa); cooling at 27° F. (15° C.)/min to ambient temperature (about 23° C.).

The resin rheology was measured on the ARES I (Advanced Rheometric Expansion System) Rheometer. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties, such as modulus and viscosity. The viscoelastic properties of the sample were measured in the melt using a parallel plate set up, at constant strain (5 percent) and temperature (190° C.), and as a function of varying frequency (0.01 to 500 s$^{-1}$). The storage modulus (G'), loss modulus (G"), tan delta, and complex viscosity (eta*) of the resin were determined using Pleometrics Orchestrator software (v. 6.5.8).

Low shear rheological characterization was performed on a Rheometrics SR5000 in stress controlled mode, using a 25 mm parallel plates fixture. This type of geometry was preferred to cone and plate because it requires only minimal squeezing flow during sample loading, thus reducing residual stresses.

Creep measurements were carried out at 170° C. and 190° C. After zeroing the gap between the parallel plates, the temperature was increased to 220° C. for sample loading (about 5 min) in order to accelerate the relaxation of normal stresses, and then decreased to the measuring temperature. Creep test was performed under a stress of 20 Pa, which is the best compromise to have a good signal to noise (S/N) ratio, while remaining in the linear (low deformation) regime. The deformation was recorded with time up to 30,000 s, or until the viscosity leveled off, indicating that the steady state was reached. The steady-state viscosity was determined using the automatic feature of the Rheometrics Orchestrator software (v. 6.5.8). Several repeats were run until the standard deviation on the steady-state viscosity decreased below 4 percent.

A Dynamic Mechanical Spectroscopy (DMS), also called frequency sweep, test in stress-controlled mode was performed before and after the first creep run to check for degradation. The angular frequency was varied from 0.1 to 100 rad/s with a stress amplitude of 1000 Pa, which corresponds to strain amplitudes between 0.1 percent (at 100 rad/s) and 10 percent (at 0.1 rad/s). It was concluded that stability was good. On the subsequent runs, the DMS test was run only after the creep test to avoid introducing perturbations due to shear history.

The steady-state data point from creep was combined with the viscosity curve from DMS to extend the accessible range of shear rates down to $10^{-6}$ 1/s, and fitted with the 4-parameter Carreau-Yasuda model:

$$\eta = c_1(1+(c_2 x)^{c_3})^{(c_4-1)/c_3} \quad (11).$$

Antioxidants, such as rgafos 168 and Irganox 1010, are commonly used to protect the polymer from thermal and/or oxidative degradation. Irganox 1010 is tetrakis (methylene (3,5-di-tert-butyl-4-hydroxyhydrocinnamate) available from Ciba Geigy Inc. Irgafos 168 is tris (2,4 di-tert-butylphenyl) phosphite available from Aldrich Chemical Company.

Sample Preparation: Polyolefin pellets were powdered using a Retsch Model ZM100 Grinder fitted with a 1.0 mm sieve. The 1.0 mm sieve produced particles with an average size of 0.5 mm. The pellets and grinder were chilled with liquid nitrogen prior to grinding. Approximately 2 grams of polymer was placed in a polystyrene cup, and about 50 mL of liquid nitrogen was added to cool the polymer. Approximately 50 mL of liquid nitrogen was poured into the funnel of the grinder to cool the mechanical parts, followed by pouring the liquid and the pellets from the polystyrene cup into the grinder.

Extraction: Five grams of the powder was extracted with 40 mls of carbon disulfide ($C_2S$) by shaking with an automated shaker for 72 hours. Five mls of the extract were taken from the clear, transparent lower layer of the $CS_2$ extract, and dried under a gently flowing dry nitrogen stream. The resulting residue was dissolved in 5 ml of isopropanol with gentle heating on a steam bath, cooled and filtered using a 0.2 μm syringe filter into a HPLC sample vial, and analyzed by HPLC according to the following procedure.

The HPLC instrument was a HP 1090 available from Hewlett-Packard, Inc. with a Thermo Hypersil column from Keystone Scientific. The column packing was Waters Spherisorb ODS 2. Column size was 150×4.6 mm, pore size 80 angstroms, and particle size 3 μm. The initial solvent was a mixture consisting of 30 percent water and 70 percent acetonitrile. At 10 minutes, 100 percent acetonitrile was introduced, then at 15 minutes, a mixture consisting of 80 percent acetonitrile and 20 percent isopropanol was introduced. Total run time was 20 minutes at a flow rate of 1 ml per minute. The 276 nm wavelength was monitored.

Calibration for each additive was performed by making up a known concentration of the additive in isopropanol (about 0.03 g per 100 ml). For oxidized Irgafos 168, the calibration was performed by oxidizing a standard isopropanol solution of Irgafos 168 with excess hydrogen peroxide for 1 hour.

Sample Preparation: Polyolefin pellets were powdered using a Retsch Model ZM100 Grinder fitted with a 1.0 mm sieve. The 1.0 mm sieve produced particles with an average size of 0.5 mm. The pellets and grinder were chilled with liquid nitrogen prior to grinding. Approximately 2 grams of polymer was placed in a polystyrene cup, and about 50 mL of liquid nitrogen was added to cool the polymer. About 50 mL of liquid nitrogen was poured into the funnel of the grinder to cool the mechanical parts, followed by pouring the liquid and the pellets from the polystyrene cup into the grinder.

Extraction: A Dionex Model 200 Accelerated Solvent Extractor (ASE) with solvent controller was used to extract the bis-sulfonyl azide (BSA) and a by-product, 4,4'-dioxybenzenesulphonamide (SA), from the powdered polymer. Approximately 0.5 g of powdered polymer was placed into an extraction thimble (available from Dionex) and the thimble was then filled about ¾ to the top with small glass beads. The contents were stirred and the thimble placed in an 11 mL cell on the ASE. The ASE conditions were as follows: 1500 psi (10.3 MPa) pressure, 120° C., preheat set to one minute, static time set to 5 minutes, flush volume set to 150 percent, purge time set to 60 seconds, number of cycles=3, cell volume=11 mL, collection vial volume was 60 mL, extraction volume was approximately 30 mL. The solvent consisted of a mixture of 95 wt percent isopropanol and 5 wt percent cyclohexane.

After extraction, the extract was immediately filtered with a 0.45 μm syringe filter (25 mm, CR PTFE available from Acrodisc) then evaporated to dryness under a gentle flow of dry nitrogen. The resulting residue was immediately dissolved in 0.5 mL of acetonitrile followed by 0.5 mL of nanopure water. This dissolution technique was necessary to allow for good peak shape of the SA in the HPLC. The solution was filtered into an HPLC autosampler vial with a 0.2 μm syringe filter (13 MM, LC13 PVDV available from Acrodisc). It is important that the HPLC analysis follow immediately after the extraction procedure to minimize decomposition of the BSA.

The conditions for the analysis for BSA and SA by HPLC were as follows:

| | Agilent 1100 Quaternary Pump | | | | |
|---|---|---|---|---|---|
| Mobile Phase: | | | A: Water | | |
| | | | B: Methanol | | |
| | | | C: off | | |
| | | | D: Acetonitrile | | |
| | Gradient Program | | | | |
| Time (min) | % A | % B | % C | % D | Flowrate (mL/min) |
| 0.0 | 58 | 2 | 0 | 40 | 0.75 |
| 1.0 | 58 | 2 | 0 | 40 | 0.75 |
| 2.0 | 40 | 20 | 0 | 40 | 0.75 |
| 9.0 | 40 | 20 | 0 | 40 | 0.75 |
| 9.1 | 2 | 2 | 0 | 96 | 0.75 |

Stop Time: 15 min
Post Time: 10 min
Column: Zorbax SB-Phenyl

-continued

| Agilent 1100 Quaternary Pump | |
|---|---|
| Length: | 15 cm |
| Diameter: | 3.0 mm |
| Packing Diameter: | 3.5 μm |
| Autosampler: | Agilent 1100 Autosampler with Injection Volume = 10 μL |
| Detector: | Agilent 1100 DAD UV/Vis Absorbance Detector |
| Wavelength: | 254 nm |
| Data Acquisition: | Agilent Chemstation |
| Initial Peak Width: | 0.087 min |

Verification of the peak as BSA was performed by retention time comparison of the sample, a sample spiked with BSA and a known standard. The estimated limit of detection was 50 parts per billion, ppb, ng/g. BSA levels were measured between 2 and 20 parts per million, ppm, μg/g, with a precision of about 10 percent relative standard deviation (RSD).

The level of the sulfonyl azide-coupling agent in the polyethylene resin was determined indirectly by measuring total sulfur in the polymer using wavelength dispersive X-ray fluorescence (XRF). Resins with varying levels of azide were characterized for total sulfur using XRF fundamental parameters analysis. The fundamental parameters software was calibrated using NIST traceable sulfur in oil standards. From these characterized polyethylene resins, a linear calibration curve was generated on the X-ray spectrometer covering a range of 10 to 42 ppm sulfur. Prior to characterization and unknown analysis, 10 g of resin was molded into a 50 mm plaques using a plate press or equivalent at temperature sufficient to melt the polymer. The precision was evaluated on separate days with a percent RSD of 1.67 and an estimated 95 percent confidence interval of 0.763 for a single value.

The analysis of Al and Ti in polyethylene and polypropylene can be determined by either X-ray fluorescence (XRF) or inductively coupled plasma (ICP) atomic emission. Either technique gives comparable results at levels above 10 μg/g for Al and 1 μg/g for Ti, but at levels below these concentrations, ICP analysis is preferred. For XRF analysis, 10 g of polymer are molded into 50 mm plaques using a plate press or equivalent at temperature sufficient to melt the polymer. Polymer standards which have been characterized by ICP analysis are used to calibrate the wavelength dispersive XRF spectrometer. For ICP analysis, 4 g of polymer are ashed in sulfuric acid at 500° C. in a muffle furnace, and the residue is digested in hot aqua regia. After dilution to 20 g, ICP analysis is performed. The ICP is calibrated using NIST traceable aqueous standards. The relative standard deviation or precision (percent RSD) for Al and Ti by XRF and ICP analysis is typically less than 5 percent, depending upon the concentration. The quantitation limit for Al and Ti by ICP analysis using preparation outlined above is 0.25 μg/g, but can be lowered by increasing the weight of polymer used in the procedure.

Brittleness temperature was measured according to ASTM D-746 Procedure A using a Tinius Olsen Brittle Point Tester with specimen Type 1 for fixture type A, tightened with torque per Note 8. Heat transfer medium was methanol or isopropanol.

Thermal Stability was measured according to ASTM D-3350-02 by a DSC technique. Thermal Stability is also called Oxidation Induction Time with the time to failure measured at 210° C.

Minimum required strength (MRS) Rating was determined in accordance with ISO 9080 using a 1 inch pipe specimen with standard dimension ratio (SDR=diameter/minimum wall thickness)=11. The pipe specimen was sealed with known internal pressure and immersed in a water bath at the specified temperature.

The resin stiffness was characterized by measuring the Flexural Modulus at 5 percent strain and Secant Modulii at 1 percent and 2 percent strain, and a test speed of 0.5 inch/min (13 mm/min) per ASTM D 790-99 Method B. The specimens were compression molded according to ASTM D-4703-00, Annex 1, with a 5 min initial heating period at approximately 190° C. and a 15° C./min cooling rate per Procedure C. The specimen was cooled to 45° C. in the press with continued cooling until "cool to the touch."

Tensile strength at yield and elongation at break were measured according to ASTM D-638-03. Both measurements were performed at 23° C. on rigid type IV specimens, which were compression molded per ASTM D 4703-00, Annex A-1, with a 5 min initial heating period at about 190° C. and a 15° C./min cooling rate per Procedure C. The specimen was cooled to 45° C. in the press, with continued cooling until "cool to the touch."

Rapid crack propagation was measured in accordance with ASTM F-2231-02a using a compression molded specimen per ASTM F-1473-01, except that the thickness was 2 mm and the notch depth was 1.5 mm. The temperature at the testing machine was 23° C.

The Pennsylvania Notch Test (PENT), a slow crack growth test, was performed following the procedure described by in ASTM F-1473-97 at 80° C. and 2.4 MPa, unless otherwise specified. In the PENT method, a single edge notched test specimen is exposed to a constant load in an oven under a well-controlled temperature. The time to failure can be measured with a timer, and the rate of failure can be measured with a microscope or a dial gauge. The notch depth is generally about 35 percent of the sample thickness. The width of the notch may vary from approximately 15 to approximately 25 mm, and the side grooves can vary from approximately 0.5 to approximately 1.0 mm, depending on the width of the specimen.

In the PENT test, a notch is made in the sample by pressing a fresh razor blade into the specimen at a speed of less than 0.25 mm/min. At speeds of less than 0.25 mm/min avoids notch tip damage and still provides a reasonably short notching time. At notching speeds of greater than about 525 μm/min, the failure time is significantly increased. Notching speeds for the side grooves is not particularly important. The apparatus should ensure that the notch and side grooves are coplanar.

During testing, care should be taken to ensure that the specimen grips appropriately arranged. To that end, the grips should be aligned and centered with respect to the longitudinal axis of the specimen. During gripping the notch should not be activated by bending or twisting the specimen. An alignment jig may be used to aid in properly gripping the specimen, to align the grips, and to avoid bending or twisting the specimen. In addition, the grips should have serrated faces to prevent slippage and the ends of the grips should be at least 10 mm from the notch.

The testing apparatus may be a direct loading device or a lever loading device. A 5:1 a lever on ratio has been found to be very convenient. The grips may be attached to the loading machine by tabs which have a universal action of that the applied to load is pure tension. The applied stress is based on the un-notched cross-sectional area. The value of the applied stress depends on the testing temperature. The recommended value is that which produces brutal fracture as fast as possible. Higher stresses produced ductile failure and lower stresses prolong the testing time. For polyethylene samples, the maximum stress for brittle failure, the applied stress should have the values of 5.6, 4.6, 4.2, and 2.4 MPa at temperatures of 23, 42, 50, 80° C., respectively. In general, the stress for brittle failure by slow crack growth should be less than one half the yield point in that particular testing temperature. The temperature should be controlled within ±0.5° C. It is not recommended that polyethylene be tested above 80° C., because significant morphological changes can occur during the test. Generally, depending on the test temperature, a 1° C. change in the past temperature will change the time to failure by 10 to 15 percent. PENT test at 80° C. was modified to use an applied stress of 3.0 MPa in the testing of the pipe samples. This represents a more severe test than the commonly accepted stress loading.

The resin environmental stress crack resistance (ESCR) was measured per ASTM-D 1693-01 Method B. Specimens were molded according to ASTM D 4703-00 Annex A with a 5 minute initial heating period at about 190° C. and a 15° C./min cooling rate per Procedure C. The specimen was cooled to 45° C. in the press with continued cooling until "cool to the touch."

In this test, the susceptibility of a resin to mechanical failure by cracking is measured under constant strain conditions, and in the presence of a crack accelerating agent such as, soaps, wetting agents, etc. Measurements were carried out on notched specimens, in a 10 percent, by volume, Igepal CO-630 (vendor Rhone-Poulec, N.J.) aqueous solution, maintained at 50° C. Ten specimens were evaluated per measurement. The ESCR value of the resin is reported as $F_{50}$, the calculated 50 percent failure time from the probability graph.

The Izod impact strength (ft.lb/in) was determined for notched compression molded plaques at 23° C. and 40° C. according to ASTM D 256-03 Method A, using a Tinius Olsen Izod Manual Impact device with a 200 inch-pound capacity pendulum.

The Tensile impact (ft lb/in$^2$) measurement was carried out per ASTM D 1822-99 with type SA compression molded plaques, short with holes and ⅜ inch (9.5 mm) wide tabs, using a Testing Machines Inc. Tensile Impact Model 43-02, with 2 foot pound (0.276 m kg) capacity pendulum.

Both Izod and Tensile compression molded plaques were prepared per ASTM D 4703-00, Annex A, with a 5 min initial heating period at about 190° C., and a 15° C./min cooling rate per Procedure C. The specimen was cooled to about 45° C. in the press with continued cooling until "cool to the touch."

Dart impact testing was done according to ASTM D 1709-04, Method A, by the staircase technique with the dart dropped around the circumference of the film sample using film specimens with 0.5 mil (13 μm) and 1.0 mil (25 μm) in thickness. The specimens were taken from a blown film line after at least 3 min of blowing the film with a clean die lip to avoid scratches. To avoid aging effects, dart impact was measured within 1 hour after the samples were taken.

Pipe was extruded on a Davis Standard 2.5 inch (63.5 mm) 24/1 L/D extrusion line, equipped with a pipe die for the manufacture of nominally 1 inch (25.4 mm) IPS (iron pipe size) pipe. The resin was premixed with a carbon black masterbatch in a McQuire feeder/blender system, and was air conveyed into a gravimetric feeder. The temperature profile and all process conditions are given in the example below. A vacuum sizing method was employed to dimensionally size the pipe. An additional cooling water tank was employed to completely solidify the pipe. Cooling water temperatures were approximately 10° C. A variable speed puller, which was run under constant speed conditions for the pipe size tested, was used. The exiting pipe was cut into 18 inch (457.2 mm) lengths for hydrostatic burst testing.

Pipe burst performance was measured according to ASTM D 1598-99, ASTM D 2837-02, ISO 1167 and ISO 9080, at the temperatures and times specified in Table 1.

The bubble stability is measured as the speed of the film line just prior to failure in ft/min (m/s). A faster film line speed, prior to failure, indicates higher bubble stability. Failure of bubble stability is defined as the inability to control the bubble, and to form film with excellent gauge (thickness) uniformity. Bubble stability is measured on the following blown film line, commercially available from Hosokawa Alpine Corporation under the following conditions:

| Extruder profile | | |
|---|---|---|
| Barrel Zone 1 | 390° F. | (199° C.) |
| Barrel Zone 2 | 400° F. | (204° C.) |
| Adapter Bottom | 400° F. | (204° C.) |
| Adapter Vertical | 410° F. | (210° C.) |
| Bottom Die | 410° F. | (210° C.) |
| Middle Die | 410° F. | (210° C.) |
| Top Die | 410° F. | (210° C.) |
| Output Rate | 100 lb/h | (45.4 kg/h) |
| Blow up ratio (BUR) | 4:1 | |
| Neck height | 32 in | (0.81 m) |
| Frost line height | 42 in | (1.07 m) |
| Melt temperature | 410° F. | (210° C.) |
| Lay Flat Width | 25.25 in | (0.64 m) |
| Film Thickness | 0.5 mil | (13 μm) |

Blown film equipment description

Alpine HS50S stationary extrusion system 50 mm 21:1 L/D grooved feed extruder
60 HP (44742 W) DC drive
extruder has a cylindrical screen changer
standard control panel with 9 RKC temperature controllers Alpine Die BF 10-25

12 spiral design
complete with insert to make up a 100 mm die diameter
Alpine Air Ring HK 300 single lip design
air lips for a 100 mm die diameter
7.5 HP (5593 W) blower with variable speed AC drive
Bubble calibration Iris Model KI 10-65 layflat width (LFW) range 7 to 39 in (0.178 to 0.991 m)
Alpine Take-Off Model A8 collapsing frame with side guides with hard wood slats
maximum LFW: 31 in (0.787 m)
roller face width: 35 in (0.889 m)
maximum takeoff speed: 500 ft/min (2.54 m/s)
4 idler rolls
Alpine surface winder Model WS8 maximum LFW: 31 in (0.787 m)
roller face width: 35 in (0.889 m)
maximum line speed: 500 ft/min (2.54 m/s)
automatic cutover Unless stated otherwise, gravimetric feed is used. Blowing and winding are begun and established at an output rate of 100 lb/h (45.4 kg/h) and winding at 82.5 ft/min (0.42 m/s) with a neck height of 32.0 in (0.81 m) with a lay flat value of 24.5 in (0.622 m) with a symmetrical bubble producing a film approximately 1.0 mil (25 μm) thick. These conditions are maintained for at least 20 minutes, after which, a 10 ft (3.05 m) sample is collected for rating the FAR, as previously described. Then the haul-off speed is increased to 165 ft/min (0.84 m/s), such that the film thickness is decreased to 0.5 mil (13 μm). Enough film is taken on a roll, to avoid wrinkles, for the collection of at least 8 dart impact measurement samples.

Both the neck height and lay flat width are maintained. The sample is taken after at least 3 minutes run time, with a clean die lip to avoid scratches. Continuing the conditions of 100 lb/h (45.4 kg/h) output rate, 165 ft/min (0.84 m/s) haul-off speed, 32.0 in (0.81 m) neck height, and 24.5 in (0.622 m) lay-flat, 0.5 mil film thickness (13 μm), the bubble blown in the process is visually observed for helical instability or bubble diameter oscillation. The number of amps required for the extruder and the extruder pressure are recorded, if desired. A bubble is considered stable as long as neither of these conditions is observed, even though some bubble chatter may be observed.

Helical instability involves decreases in diameter in a helical pattern around the bubble. Bubble diameter oscillation involves alternating larger and smaller diameters.

Vertical Bubble Stability is also examined. Further, the maximum bubble stability is measured by maintaining a constant extruder output rate of 100 lb/h (45.4 kg/h), while the haul-off speed is increased to decrease the film thickness, until the bubble becomes unstable, or neck height oscillation or increase and decrease of neck height is observed. The haul-off speed is increased in approximately 10 ft/min (0.05 m/s) increments, while the air ring blower setting is adjusted to maintain the neck height, until vertical oscillation is observed. The haul-off speed where oscillation of amplitude greater than 4 inches (100 mm) is recorded as the vertical bubble stability value. This is recorded in ft/min or m/s.

In the embodiment suitable for pipes, the HMW component has a melt flow rate, $I_2$(190° C., 2.16 kg weight, ASTM 1238-03) ranging from 0.001 to 1.0 g/per 10 min. In some embodiments the $I_2$ melt flow rate ranges from 0.01 to 0.2 g/per 10 min. In some embodiments the melt flow rate is less than, or equal to, 0.1 g/10 min, preferably the component is characterized as having an $I_2$ from 0.001 to 0.1 g/10 min, more preferably from 0.005 to 0.05 g/10 min, most preferably from 0.0085 to 0.017 g/10 min. All individual values and subranges from 0.001 to 1.0 g/10 min ($I_2$) are included herein and disclosed herein. The melt flow rate, $I_{21}$, (190° C., 21.6 kg weight, ASTM 1238-03) can be in the range from 0.20 to 5.0 grams per 10 minutes, and is preferably in the range from 0.25 to 4 grams per 10 minutes. In some embodiments, the melt flow rate ranges from 0.25 to 1.00 grams per 10 minutes. In yet other embodiments the melt flow rate ranges from 0.28 to 0.6, and in other embodiments, it ranges from 0.3 to 0.5 grams per 10 minutes. All individual values and subranges from 0.20 to 5.0 g/10 min ($I_{21}$) are included herein and disclosed herein. The flow rate ratio, $I_{21}/I_2$, of the polymer can be in the range from 20 to 65, and is preferably from 22 to 50, and more preferably from 23 to 40, and most preferably from 23 to 35. All individual values and subranges from 20 to 65 ($I_{21}/I_2$) are included herein and disclosed herein.

The $M_w$ of the HMW component is preferably in the range from 100,000 to 600,000 g/mol (as measured by Gel Permeation Chromatography), more preferably in the range from 250,000 to 500,000 g/mol, and most preferably in the range from 260,000 to 450,000 g/mol. All individual values and subranges from 100,000 to 600,000 g/mol ($M_w$) are included herein and disclosed herein. The $M_w/M_n$ of the HMW component is preferably relatively narrow. That is, preferably the $M_w/M_n$ of the HMW component is less than 8, more preferably less than, or equal to, 7.5, most preferably in the range from 3 to 7, and especially in the range of from 3.5 to 6.5. All individual values and subranges from 3 to 8 ($M_w/M_n$) are included herein and disclosed herein.

The HMW component typically has a lower density than the LMW component, as described below. The density of the HMW component generally ranges from 0.890 to 0.945 g/cc (ASTM 792-03), preferably in the range from 0.910 to 0.940 g/cc. In some embodiments the density range from 0.915 to 0.935 g/cc, and more preferably from 0.920 to 0.932 g/cc, and most preferably from 0.924 to 0.932 g/cc. All individual values and subranges from 0.890 to 0.945 g/cc are included herein and disclosed herein.

In an embodiment suitable for blown films, the melt flow rate, 21, of the high molecular weight polymer component is in the range from 0.01 to 50, preferably from 0.2 to 12, more preferably from 0.2 to 1, and most preferably from 0.2 to 0.5 g/10 min. All individual values and subranges from 0.01 to 50 g/10 min ($I_{21}$) are included herein and disclosed herein. The flow rate ratio, $I_{21}/I_5$, of the polymer is advantageously at least 6, preferably at least 7, and up to preferably 15, more preferably up to 12. The molecular weight, $M_w$ (as measured by Gel Permeation Chromatography) of this polymer is advantageously in the range from 135,000 to 445,000 g/mol, and more preferably from 200,000 to 440,000, and most preferably from 250,000 to 435,000. All individual values and subranges from 135,000 to 445,000 g/mol ($M_w$) are included herein and disclosed herein. The density of the polymer is advantageously at least 0.860 g/cc, and is preferably in the range from 0.890 to 0.940 g/cc more preferably in the range from 0.920 to 0.932 g/cc. All individual values and subranges from 0.860 to 0.940 g/cc are included herein and disclosed herein.

In an embodiment suitable for blow molded articles, the melt flow rate, $I_{21}$, of the high molecular weight polymer component is advantageously in the range from 0.01 to 50, preferably in the range from 0.1 to 12, more preferably from 0.1 to 1.0 grams per 10 minutes, and most preferably in the range from 0.15 to 0.8 grams per 10 minutes. All individual values and subranges from 0.01 to 50 g/10 min ($I_{21}$) are included herein and disclosed herein. The flow rate ratio, $I_{21}/I_2$, of the polymer can be in the range from 20 to 65, and preferably in the range from 20 to 40. All individual values and subranges from 20 to 65 ($I_{21}/I_2$) are included herein and disclosed herein. The density of the polymer is advantageously at least 0.860 g/cc, and is preferably in the range from 0.890 to 0.980 g/cc, more preferably in the range from 0.920 to 0.980 g/cc. All individual values and subranges from 0.860 to 0.980 g/cc are included herein and disclosed herein.

In the embodiment suitable for pipes, the LMW component has an $I_2$ melt flow rate that preferably ranges from 40 to 2000 g/10 min, preferably this component is characterized as having an $I_2$ melt flow rate from 80 to 1200 g/10 min, more preferably from 400 to 1100 g/10 min, and most preferably from 600 to 1000 g/10 min. In some embodiments, the melt flow rate is in the range from 500 to 1000 g/10 min. All individual values and subranges from 40 to 2000 g/10 ($I_2$) min are included herein and disclosed herein. The flow rate ratio, $I_{21}/I_2$, of this polymer, or copolymer, can be in the range from 10 to 65, and is preferably from 15 to 60, or 20 to 50. In some embodiments, the melt flow ratio is from 22 to 40. All individual values and subranges from 10 to 65 ($I_{21}/I_2$) are included herein and disclosed herein.

The $M_w$ of the LMW component is preferably less than 100,000 g/mol. Preferably, the $M_w$ of the LMW component is in the range from 10,000 to 40,000, and more preferably in the range from 15,000 to 35,000 g/mol. In some embodiments the $M_w$ of the LMW component ranges from 25,000 to 31,000 g/mol. All individual values and subranges from 10,000 to 40,000 g/mol ($M_w$) are included herein and disclosed herein. The $M_w/M_n$ of the LMW component is preferably less than 5, more preferably in the range from 1.5 to 4.8, or from 2 to 4.6, and most preferably in the range from 3.2 to 4.5. In some embodiments the $M_w/M_n$ ranges from 2.5 to 3.5, or from 2.7 to 3.1. All individual values and subranges from 1.5 to 5 ($M_w/M_n$) are included herein and disclosed herein.

The LMW component is typically the higher density component. The density of the polymer, or copolymer, can be in the range from 0.940 to 0.980 g/cc, and is preferably in the range from 0.945 to 0.975 g/cc, and more preferably from 0.968 to 0.975 g/cc. In some embodiments, the density of the LMW component is from 0.955 to 0.965 g/cc. All individual values and subranges from 0.940 to 0.980 g/cc are included herein and disclosed herein. It is preferred to maintain the LMW component at the highest density, and thus maximize the delta density difference between this component and the HMW component.

In an embodiment suitable for blown films, the melt flow rate, $I_2$ of the low molecular weight polymer component is in the range from 0.5 to 3000 g/10 min, preferably from 1 to 1000 g/10 min. All individual values and subranges from 0.5 to 3000 g/10 min ($I_2$) are included herein and disclosed herein. The flow rate ratio, $I_{21}/I_5$, of this polymer can be in the range from 5 to 25, preferably from 6 to 12. All individual values and subranges from 5 to 25 ($I_{21}/I_5$) are included herein and disclosed herein. The molecular weight, $M_w$ (as measured by Gel Permeation Chromatography (GPC)) of this polymer, is generally in the range from 15,800 to 55,000 g/mol. All individual values and subranges from 15,800 to 55,000 g/mol ($M_w$) are included herein and disclosed herein. The density of this polymer is at least 0.900 g/cc, and is preferably from 0.940 to 0.975 g/cc, and most preferably from 0.960 to 0.975 g/cc. All individual values and subranges from 0.900 to 0.975 g/cc are included herein and disclosed herein. It is preferred to maintain the LMW component at the highest density, and thus maximize the delta density difference between this component and the HMW component.

In an embodiment suitable for blow molded articles, the LMW component has an $I_2$ melt flow rate that preferably ranges from 40 to 2000 g/10 min, preferably this component is characterized as having an $I_2$ melt flow rate from 100 to 1500 g/10 min, more preferably from 400 to 1200 g/10 min. All individual values and subranges from 40 to 2000 g/10 min ($I_2$) are included herein and disclosed herein. The flow rate ratio, $I_{21}/I_2$, of this polymer, or copolymer, can be in the range from 20 to 65, and is preferably from 20 to 40. All individual values and subranges from 20 to 65 ($I_{21}/I_2$) are included herein and disclosed herein. The density of the LMW component can be in the range from 0.940 to 0.980 g/cc, and is preferably in the range from 0.960 to 0.975 g/cc. All individual values and subranges from 0.940 to 0.980 g/cc are included herein and disclosed herein. It is preferred to maintain the LMW component at the highest density, and thus maximize the delta density difference between this component and the HMW component.

In the embodiment suitable for pipes, the blend or final product can have a melt flow rate, $I_5$, (190° C., 5.0 kg) in the range from 0.01 to 2.0 g/10 min, and preferably has an $I_5$, in the range of 0.05 to 1.0 g/10 min. In some embodiments, the $I_5$ of the composition is from 0.1 to 0.9 g/10 min, preferably in the range from 0.01 to 0.5 g/10 min, more preferably from 0.05 to 0.45 g/10 min. All individual values and subranges from 0.01 to 2.0 g/10 min ($I_5$) are included herein and disclosed herein. The melt flow rate $I_{21}$ ranges from 2 to 50 g/10 min. In some embodiments, the blend has an $I_{21}$ in the range from 3 to 20 g per 10 min, preferably from 4 to 10 g per 10 min. All individual values and subranges from 2 to 50 g/10 min ($I_{21}$) are included herein and disclosed herein. The flow rate ratio, $I_{21}/I_5$, of the blend can be in the range from 10 to 50, and is preferably in the range from 15 to 45, or in the range from 20 to 42. All individual values and subranges from 10 to 50 ($I_{21}/I_5$) are included herein and disclosed herein.

The molecular weight, $M_w$, of the blend is, generally, in the range from 200,000 to 490,000 g/mol. All individual values and subranges from 200,000 to 490,000 g/mol ($M_w$) are included herein and disclosed herein. In some embodiments, the blend has a broad, bimodal molecular weight distribution. The broad molecular weight distribution is reflected in an $M_w/M_n$ ratio from 15 to 48, preferably from 18 to 45, and most preferably from 20 to 40. All individual values and subranges from 15 to 48 ($M_w/M_n$) are included herein and disclosed herein.

The polyethylene composition is also characterized as having an overall density greater than, or equal to, 0.940 g/cc, preferably in the range from 0.940 to 0.962 g/cc, more preferably from 0.944 to 0.960 g/cc, and most preferably from 0.945 to 0.955 g/cc. All individual values and subranges from 0.940 to 0.962 g/cc are included herein and disclosed herein.

The weight ratio of polymer, or copolymer, prepared in the high molecular weight reactor, to polymer, or copolymer, prepared in the low molecular weight reactor is referred to as the "split" of the polymer composition. In some embodiments, the split of the polymer compositions, described herein, can be in the range from 0.8:1 to 2.3:1, and is preferably in the range from 0.9:1 to 1.9:1. The optimum split is from 1.2:1 to 1.6:1. In some embodiments the split is from 1.0:1 to 2.0:1. All individual values and subranges from 0.8:1 to 2.3:1 are included herein and disclosed herein.

The split can also be essentially reflected by the weight percent of the HMW component and the LMW component in the blend composition. The HMW polymer component can be present in the composition from 0.5 to 99.5 percent, based on the total weight of the HMW component and the LMW component. All individual values and subranges from 0.5 to 99.5 percent (HMW component) are included herein and disclosed herein. In some embodiments, the composition comprises from 65 to 35 weight percent, more preferably from 62 to 45 weight percent of the HMW ethylene component. Likewise, the polymer composition may comprise from 0.5 to 99.5 weight percent of the LMW component, based on the total weight of the HMW component and the LMW component. In some embodiments, the novel composition comprises from 35 to 65 weight percent, preferably from 38 to 55 weight percent of a LMW high density ethylene homopolymer component. All individual values and subranges from 0.5 to 99.5 percent (LMW component) are included herein and disclosed herein.

Alternatively, the novel composition can be characterized as having $M_{v1}/M_{v2}$ ratio of less than, or equal to, 0.8, preferably less than, or equal to, 0.6, more preferably less than, or equal to, 0.4, where $M_{v1}$ is the viscosity average molecular weight of the LMW, high density component, and $M_{v2}$ is the viscosity average molecular weight of the HMW polymer (or interpolymer) component, as determined using ATREF-DV analysis, as described in detail in WO 99/14271, the disclosure of which is incorporated herein by reference. WO 99/14271 also describes a suitable deconvolution technique for multicomponent polymer blend compositions.

In a preferred embodiment, the inventive compositions do not contain a propylene homopolymer or a propylene-based interpolymer. As used herein, the term "propylene-based interpolymer" refers to propylene interpolymers containing at least 50 mole percent propylene, polymerized therein.

In an embodiment suitable for blown films, the weight ratio of polymer (or copolymer) prepared in the high molecular weight reactor to polymer (or copolymer) prepared in the low molecular weight reactor can be in the range from 30:70 to 70:30, and is preferably in the range from 40:60 to 60:40. All individual values and subranges from 30:70 to 70:30 are included herein and disclosed herein. The density of the blend can be at least 0.940 g/cc, and is preferably in the range from 0.945 to 0.960 g/cc. All individual values and subranges from 0.945 to 0.960 g/cc are included herein and disclosed herein. The blend or final product, as removed from the second reactor, may have a melt flow rate, $I_5$, in the range from 0.2 to 1.5 g/10 min, preferably from 0.25 to 1.0 g/10 min. All individual values and subranges from 0.2 to 1.5 g/10 min ($I_5$) are included herein and disclosed herein. The flow rate ratio, $I_{21}/I_5$, is in the range from 20 to 50, preferably of from 24 to 45. All individual values and subranges from 20 to 50 ($I_{21}/I_5$) are included herein and disclosed herein. The molecular weight, $M_w$ of the final product is, generally, in the range from 90,000 to 420,000 g/mol. All individual values and subranges from 90,000 to 420,000 g/mol ($M_w$) are included herein and disclosed herein. The bulk density can be in the range from 18 to 30 pounds per cubic foot, and is preferably greater than 22 pounds per cubic foot (288, 481, and 352 kg/m$^3$, respectively). All individual values and subranges from 18 to 30 pounds per cubic foot are included herein and disclosed herein. The blend has a broad molecular weight distribution, which, as noted, can be characterized as multimodal. The broad molecular weight distribution is reflected in a PDI ($M_w/M_n$) ratio from 15 to 48, preferably from 18 to 45. All individual values and subranges from 15 to 48 ($M_w/M_n$) are included herein and disclosed herein.

In an embodiment suitable for blow molded articles, the blend or final product can have a melt flow rate, $I_5$, (190 C, 5.0 kg) in the range from 0.01 to 5.0 g/10 min, preferably in the range from 0.05 to 5.0 g/10 min, more preferably from 0.1 to 2.0 g/10 min. All individual values and subranges from 0.01 to 5.0 g/10 min ($I_5$) are included herein and disclosed herein. The melt flow rate, $I_{21}$, ranges from 2 to 60 g/10 min, preferably from 3 to 40 g/10 min, more preferably from 4 to 15 g/10 min. All individual values and subranges from 2 to 60 g/10 min ($I_{21}$) are included herein and disclosed herein. The flow rate ratio, $I_{21}/I_5$, of the blend can be in the range from 10 to 50, preferably in the range from 15 to 48, or more preferably in the range from 15 to 42. All individual values and subranges from 10 to 50 ($I_{21}/I_5$) are included herein and disclosed herein. The resin composition is also characterized as having an overall density of greater than, or equal to, 0.940 g/cc, preferably in the range from 0.940 to 0.980 g/cc, more preferably from 0.950 to 0.975 g/cc. All individual values and subranges from 0.940 to 0.980 g/cc are included herein and disclosed herein. The composition comprises from 75 to 35 weight percent, more preferably from 70 to 40 weight percent of the HMW component. All individual values and subranges from 75 to 35 are included herein and disclosed herein.

In one embodiment, the high molecular weight component and/or the low molecular weight component is a heterogeneously branched interpolymer(s), typically produced by Ziegler-Natta type catalysts, and containing a non-homogeneous distribution of comonomer among the molecules of the interpolymer.

In another embodiment, the high molecular weight component and/or the low molecular weight component is a homogeneously branched linear or substantially linear ethylene interpolymer(s) or copolymer(s).

The term "linear ethylene/α-olefin polymers" represents polymers that have an absence of long chain branching, as for example the linear low density polyethylene polymers or linear high density polyethylene polymers made using uniform branching (that is, homogeneously branched) distribution polymerization processes (for example, U.S. Pat. No. 3,645,992 (Elston), the disclosure of which is incorporated herein, in its entirety, by reference), and are those in which the comonomer is randomly distributed within a given interpolymer molecule, and wherein substantially all of the interpolymer molecules have the same ethylene/comonomer ratio within that interpolymer. This is in contrast to heterogeneously branched interpolymers, typically produced by Ziegler-Natta type catalysts, and containing a non-homogeneous distribution of comonomer among the molecules of the interpolymer. The term "linear ethylene/α-olefin polymers" does not refer to high pressure branched polyethylene, which is known to those skilled in the art to have numerous long chain branches.

The substantially linear ethylene copolymers or interpolymers (also known as "SLEPs") are especially preferred. "Substantially linear" means that a polymer has a backbone substituted with from 0.01 to three long-chain branches per 1000 carbons in the backbone, preferably from 0.01 to one long chain branches per 1000 carbons, and more preferably from 0.05 to one long chain branches per 1000 carbons.

The substantially linear ethylene/α-olefin interpolymers of the present is invention are described in U.S. Pat. No. 5,272,236 and in U.S. Pat. No. 5,278,272, each incorporated herein in its entirety by reference. Useful substantially linear ethylene/α-olefin interpolymers are those in which the comonomer is randomly distributed within a given interpolymer molecule, and wherein substantially all of the interpolymer molecules have the same ethylene/comonomer ratio within that interpolymer. The substantially linear ethylene/α-olefin interpolymers also have a single melting peak, as opposed to heterogeneously branched linear ethylene polymers, which have two or more melting peaks.

In one embodiment, the ethylene interpolymers have a uniform distribution of comonomer, such that the comonomer content of polymer fractions, across the molecular weight range of the interpolymer, vary by less than 10 weight percent, preferably less than 8 weight percent, more preferably less than 5 weight percent, and even more preferably less than 2 weight percent.

SLEPs are characterized by narrow molecular weight distribution (MWD) and narrow short chain branching distribution (SCBD), and may be prepared as described in U.S. Pat. Nos. 5,272,236 and 5,278,272, relevant portions of both being incorporated herein by reference. The SLEPs exhibit outstanding physical properties by virtue of their narrow MWD and narrow SCBD, coupled with long chain branching (LCB). In one embodiment, the MWD is from 1 to 5, preferably from 1.5 to 4, and more preferably from 2 to 3.

U.S. Pat. No. 5,272,236 (column 5, line 67 through column 6, line 28) describes SLEP production, via a continuous controlled polymerization process, using at least one reactor, but allows for multiple reactors, at a polymerization temperature and pressure sufficient to produce a SLEP having desired properties. Polymerization preferably occurs via a solution polymerization process at a temperature of from 20° C. to 250° C., using constrained geometry catalyst technology. Suitable constrained geometry catalysts are disclosed at column 6, line 29 through column 13, line 50 of U.S. Pat. No. 5,272,236.

A preferred SLEP has a number of distinct characteristics, one of which is an ethylene content that is between 20 and 90 wt percent, more preferably between 30 and 89 wt percent, with the balance comprising one or more comonomers. The ethylene and comonomer contents are based on SLEP weight, and are selected to attain a total monomer content of 100 weight percent. For chain lengths up to six carbon atoms, SLEP comonomer content can be measured using C-13 NMR spectroscopy.

The final polymerization product polymer composition is rheology modified, also known as coupled, by polyfunctional sulfonyl azides as disclosed in U.S. Pat. No. 6,521,306, incorporated herein by reference.

To modify rheology, also referred to herein as "to couple," the poly(sulfonyl azide) is used in a rheology modifying amount, that is an amount effective to increase the low-shear viscosity (at <0.1 rad/s) of the polymer preferably at least about 5 percent as compared with the starting material polymer, but less than a cross linking amount, that is an amount sufficient to result in less than 1 weight percent of gel, as measured by ASTM D 2765—Procedure A. While those skilled in the art will recognize that the amount of azide sufficient to increase the low shear viscosity, and result in less than about 1 weight percent gel will depend on molecular weight of the azide used and polymer; the amount is preferably less than about 5 percent, more preferably less than about 2 percent, most preferably less than about 1 weight percent poly(sulfonyl azide), based on total weight of polymer when the poly(sulfonyl azide) has a molecular weight from 200 to 2000 g/mol. To achieve measurable rheology modification, the amount of poly(sulfonyl azide) is preferably at least 0.0025 weight percent, more preferably at least 0.005 weight percent, most preferably at least 0.01 weight percent, based on total polymer.

The polymer rheology modification process is described in greater detail later in the text.

Compared to past generations of industry standard ASTM PE 3408 materials, pipes made from polymers described herein have PENT values of at least 1,000 hours. Some pipes have PENT values of greater than 5000 hours, and up to 25,000 hours or more at 2.4 MPa. Pipes with a PENT value of 25,000 hours are 250 times more resistant to slow crack growth (SCG), when compared to the most stringent requirements for gas pipe in ASTM D2513-99. Some pipes have PENT values greater than 1,000 hours, and up to 11,000 hours, 15,000 hours, or more, at 3.0 MPa. Some pipes made from the polyethylene described herein qualify as PE 100 resins with extrapolated lifetimes of 100 years, and validated by ISO 9080-99 for lifetimes of 250 years at 20° C. Pipes also have superior rapid crack propagation properties in the S4 test for critical temperature, Tc, and critical pressure, Pc. The Tc and Pc are determined according to ISO 13477. Burst property performance (Categorized Required Stress), is listed according to Plastics Pipe Institute (PPI) Technical Report TR-3, at 60 and 80° C., of at least 6.3 and 4.0 MPa.

As demonstrated in the Examples, the coupled polymer composition has surprisingly high viscosity at very low shear, that is, creep flow conditions. A nearly 10-fold increase in creep flow viscosity can be achieved without substantially comprising other product or process characteristics.

Typical transition metal catalyst systems, which can be used to prepare the blend, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; and a metallocene catalyst system such as those described in U.S. Pat. Nos. 4,937,299; 5,317,036; and 5,527,752. Catalyst systems that use molybdenum oxides on silica-alumina supports, are also useful. Preferred catalyst systems for preparing the components for the blends of this invention are Ziegler-Natta catalyst systems and metallocene catalyst systems.

In some embodiments, preferred catalysts used in the process to make the compositions of the present invention are of the magnesium/titanium type. In particular, for the present gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. Nos. 6,187,866 and 5,290,745, the entire contents of both of which are herein incorporated by reference. Precipitated/crystallized catalyst systems, such as those described in U.S. Pat. Nos. 6,511,935 and 6,248,831, the entire contents of both of which are herein incorporated by reference, may also be used.

Preferably the catalyst precursor has the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains approximately 1 to approximately 20 moles of electron donor per mole of titanium compound and preferably approximately 1 to approximately 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support and dried to form a solid catalyst; it is preferred that the solution be converted into a solid catalyst via spray drying. Each of these methods thus forms a "supported catalyst precursor".

The spray dried catalyst product is then preferentially placed into an mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump is typically used in commercial reaction systems, while a dual piston syringe pump is typically used in pilot scale reaction systems, where the catalyst flows are less than, or equal to, 10 cm$^3$/hour (2.78×10$^{-9}$ m$^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483 may also be used.

The cocatalysts, which are reducing agents, conventionally used, are comprised of aluminum compounds, but compounds of lithium, sodium and potassium, alkaline earth metals, as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula $AlR_aX_bH_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms and the trialkylaluminums. Examples are diethylaluminum chloride and tri-n-hexylaluminum. About 0.10 to 10 moles, and preferably 0.15 to 2.5 moles, of activator are used per mole of electron donor. The molar ratio of activator to titanium is in the range from 1:1 to 10:1, and is preferably in the range from 2:1 to 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctyl aluminum, tridecyl aluminum, tridodecyl aluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silicalalumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 µm and preferably 30 to 100 µm; a surface area of at least 200 m$^2$/g and preferably at least 250 m$^2$/g; and a pore size of at least 100×10$^{-10}$ m and preferably at least 200×10$^{-10}$ m. Generally, the amount of support used is that which will provide 0.1 to 1.0 millimole of titanium per gram of support and preferably 0.4 to 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

In another embodiment, metallocene catalysts, single-site catalysts and constrained geometry catalysts may be used in the practice of the invention. Generally, metallocene catalyst compounds include half and full sandwich compounds having one or more π-bonded ligands including cyclopentadienyl-type structures or other similar functioning structure such as pentadiene, cyclooctatetraendiyl and imides. Typical compounds are generally described as containing one or more ligands capable of n-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Exemplary of metallocene-type catalyst compounds are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. All of these references are incorporated herein, in their entirety, by reference.

Suitable catalysts for use herein, preferably include constrained geometry catalysts as disclosed in U.S. Pat. Nos. 5,272,236 and 5,278,272, which are both incorporated in their entirety by reference.

The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex comprising a metal of groups 3-10 or the Lanthanide series of the Periodic Table of the Elements, and a delocalized π-bonded moiety, substituted with a constrain-inducing moiety. Such a complex has a constrained geometry about the metal atom. The catalyst further comprises an activating cocatalyst.

Chromium Based Catalysts and Resins

In a separate embodiment another type of catalyst based on chromium is used in a single reactor configuration, although it is not limited to a single reactor and can be used in two or more reactors in series.

Polyethylene resins polymerized from these chromium based catalysts and methods to make them, are generally known in the art. This includes gas-phase, solution phase and slurry-phase polymerization processes. Of particular interest to the present invention are resins made in the gas-phase process, those made using a chromium catalyst, and in particular, a titanated chromium catalyst.

Typical, useful catalysts consists of a chromium (VI) compound (typically as the oxide) supported on a high surface area refractory oxide support. Generally the support is an amorphous microspheroidal silica, silica alumina, silica titania or aluminophosphate. The catalyst is prepared by activating the chromium-containing support at temperatures of 400-1000° C., in a dry, oxygen-containing atmosphere. Modifying materials such as titanium and fluoride are generally added prior to the activation.

Generally, catalysts are prepared by using commercially available silica to which a chrome source has been added. The silica substrate may be treated with a titanium ester (titanium tetraisopropylate or titanium tetraethoxide are typically used) either after the Cr compound is deposited or prior to this deposition. The support is generally pre-dried at 150-200° C. to remove physically adsorbed water. The titanate may be added as a solution to a slurry of the silica in isopentane solvent or directly into a fluidized bed of support. If added in slurry form, the slurry is dried. Generally, the Cr compound which is convertible to Cr+6 has already been added to the support. The support is then converted into active catalyst by calcination in air at temperatures up to 1000° C.

During activation, the titanium is converted to some type of surface oxide. The chromium compound (generally chromium (III) acetate) is converted to a $Cr^{+6}$ oxide of some kind. Fluoridation agents may also be added during the activation process to selectively collapse some pores in the support, modifying the molecular weight response of the catalyst. The activated catalyst may also be treated with reducing agents prior to use, such as carbon monoxide in a fluidized bed, or other reducing agents, such as aluminum alkyls, boron alkyls, lithium alkyls and the like.

Catalysts of this type are described in numerous patents, such as WO2004094489, EP0640625, U.S. Pat. No. 4,100,105, and the references cited therein. Each of these references is incorporated, in its entirety, by reference. For example, a useful catalyst is a supported chromium-titanium catalyst (or titanated chrome oxide catalyst) which is substantially non-spherical or irregular in shape, and has a broad particle size distribution, with at least 70 percent of its pore volume ranging in pores of diameter between 200 to 500 Angstroms. Such a supported complex can be activated by heating in the presence of oxygen, at a temperature from 850° C. to the sintering temperature of the supported complex. Catalysts such as those described in U.S. Pat. No. 6,022,933, also containing a $Cr^{+6}$ component, are also useful in the invention. This reference is also incorporated herein, in its entirety, by reference.

In a preferred embodiment, unimodal resins, based on polyethylene (Cr-based) polymers, and, in particular, on high density polyethylene polymers, are coupled by an azide coupling process as described herein. In another embodiment, a blend of two or more resins, containing at least one chromium catalyzed, polyethylene polymer, is coupled by an azide coupling process as described herein.

In one embodiment, the Cr-catalyzed polymer has a melt flow rate, $I_2$ (190° C., 2.16 kg weight, ASTM 1238-03) ranging from 0.01 to 20 g/10 min. In some embodiments the I2 ranges from 0.1 to 15 g/per 10 min. In some embodiments the $I_2$ is less than, or equal to, 0.1 g/10 min, and preferably the polymer is characterized as having an $I_2$ of from 0.5 to 10 g/10 min, more preferably from 1 to 10 g/10 min. In another embodiment, the $I_2$ is from 0.0085 to 0.017 g/10 min. All individual values and subranges 0.001 to 20 g/10 min ($I_2$) are included herein and disclosed herein.

The melt flow rate, $I_{21}$, (190° C., 21.6 kg weight, ASTM 1238-03), chromium-based polymer, can be in the range from 1 to 50 grams per 10 minutes, and is preferably in the range from 2 to 30 grams per 10 minutes. In some embodiments, the melt flow rate ranges from 5 to 20. All individual values and subranges from 1 to 50 g/10 ($I_{21}$) min are included herein and disclosed herein.

The flow rate ratio, $I_{21}/I_2$, of the polymer can be in the range from 40 to 200, and is preferably from 50 to 150, and most preferably from 55 to 130. In other embodiments, the $I_{21}/I_2$ of the polymer is in the range from 65 to 125, and preferably from 80 to 120. All individual values and subranges 40 to 200 ($I_{21}/I_2$) are included herein and disclosed herein.

The $M_w$ of this polymer is preferably in the range from 100,000 to 600,000 g/mol (as measured by Gel Permeation Chromatography), more preferably in the range of from 200,000 to 500,000 g/mol, and most preferably in the range of from 210,000 to 450,000 g/mol. All individual values and subranges from 100,000 to 600,000 g/mol ($M_w$) are included herein and disclosed herein.

This polymer has a density that generally ranges from 0.890 to 0.975 g/cc (ASTM 792-03), preferably in the range from 0.920 to 0.970 g/cc. In some embodiments the density ranges from 0.930 to 0.960 g/cc, and more preferably in the range from 0.940 to 0.955 g/cc. All individual values and subranges from 0.890 to 0.975 g/cc are included herein and disclosed herein.

The chromium catalyzed resin made be prepared in one reactor, or may be prepared as a blend in two or more reactors, operated in parallel, in series, or in a combination thereof. In a preferred dual reactor configuration, the catalyst precursor and the cocatalyst are introduced in a first reactor, and the polymerizing mixture is transferred to the second reactor for further polymerization. Additional polymerization processes are described herein.

The novel composition comprising the HMW component and the LMW component, as discussed in the prior sections, can be made by a variety of methods. For example, it may be made by blending or mixing a LMW polyethylene component and a HMW polymer component or by melt-blending the individually melted components. Alternatively, it may be made in situ in one or more polymerization reactors.

In a preferred dual reactor configuration of the process of the present invention, the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor, followed by further in reactor activation by the cocatalyst.

In the preferred dual reactor configuration, a relatively high molecular weight (low melt flow index) copolymer is prepared in the first reactor. Alternatively, the low molecular weight copolymer can be prepared in the first reactor and the high molecular weight copolymer can be prepared in the second reactor. For purposes of the present disclosure, the reactor in which the conditions are conducive to making a high molecular weight polymer is known as the "high molecular weight reactor." Alternatively, the reactor in which the conditions are conducive to making a low molecular weight polymer is known as the "low molecular weight reactor." Irrespective of which component is made first, the mixture of polymer and an active catalyst is preferably transferred from the first reactor to the second reactor via an interconnecting device using nitrogen or second reactor recycle gas as a transfer medium.

The polymerization in each reactor is preferably conducted in the gas phase using a continuous fluidized bed process. In a typical fluidized bed reactor the bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, that is, comonomers and, if desired, modifiers and/or one or more inert carrier gases.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein incorporated by reference.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952, the entire contents of which are herein incorporated by reference, is particularly useful.

The pressure is about the same in both the first and second reactors. Depending on the specific method used to transfer the mixture of polymer and contained catalyst from the first reactor to the second reactor, the second reactor pressure may be either higher than or somewhat lower than that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in either reactor, can be in the range of 200 to 500 psig (pounds per square inch gauge) and is preferably in the range of 280 to 450 psig (1.38, 3.45, 1.93 and 3.10 MPa, respectively). The ethylene partial pressure in the first reactor can be in the range of 10 to 150 psig, and is preferably in the range of 20 to 80 psig, and more preferably is in the range of 25 to 60 psig, (68.9, 103.4, 138, 552, 172 and 414 MPa, respectively). The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane, hexane also contribute to the overall pressure in the reactor according to their vapor pressure under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of 0.5 to 10 percent by weight, or more preferably 0.8 to 4 percent by weight, based on the weight of the copolymer.

The residence time of the mixture of reactants including gaseous and liquid reactants, catalyst, and resin in each fluidized bed can be in the range of 1 to 12 hours and is preferably in the range of 1.5 to 5 hours.

The reactors can be run in the condensing mode, if desired. The condensing mode is described in U.S. Pat. No. 4,543,399, U.S. Pat. No. 4,588,790 and U.S. Pat. No. 5,352,749, the entire contents of which are herein incorporated by reference.

While the polyethylene blends of subject invention are preferably produced in the gas phase by various low pressure processes, the blend can also be produced in the liquid phase in solutions or slurries, or as a combination of slurry and gas phase, or gas phase and solution, or slurry and solution, each in either oder, by conventional techniques, again at low pressures. Low pressure processes are typically run at pressures below 1000 psi whereas high pressure processes are typically run at pressures above 15,000 psi (6.89 and 103 MPa, respectively).

Preferred operating temperatures vary depending on the density desired, that is, lower temperatures for lower densities and higher temperatures for higher densities. Operating temperature will vary of from 70° C. to 110° C. The mole ratio of alpha-olefin to ethylene in this reactor can be in the range of from 0.01:1 to 0.8:1, and is preferably in the range of from 0.02:1 to 0.35:1. The mole ratio of hydrogen (if used) to ethylene in this reactor can be in the range of from 0.001:1 to 0.3:1, preferably of from 0.01 to 0.2:1.

In an embodiment suitable for pipes, the operating temperature is generally in the range of from 70° C. to 110° C. The operating temperature is preferably varied with the desired density to avoid product stickiness in the reactor. The mole ratio of alpha-olefin to ethylene can be in the range of from 0:00001 to 0.6:1, preferably in the range of from 0.0002:1 to 0.010:1. The mole ratio of hydrogen to ethylene can be in the range of from 0.01:1 to 3:1, and is preferably in the range of from 0.5:1 to 2.2:1.

In an embodiment suitable for blown films, the high molecular weight reactor operating temperature is generally in the range from 70° C. to 110° C. The mole ratio of alpha-olefin to ethylene is less than is used in the high molecular weight reactor and advantageously at least 0.0005:1, preferably at least 0.00001:1 and advantageously less than or equal to 0.6:1, more advantageously less than or equal to 0.42:1, preferably less than or equal to 0.01:1, more preferably less than or equal to 0.007:1, most preferably less than or equal to 0.0042:1. At least some alpha olefin accompanies the high molecular weight reactor contents. The mole ratio of hydrogen to ethylene can be in the range of from 0.01:1 to 3:1, and is preferably in the range of from 0.5:1 to 2.2:1.

In an embodiment suitable for blow molding, the high molecular weight reactor operating temperature is generally in the range from 70° C. to 110° C. The mole ratio of alpha-olefin to ethylene in this reactor can be in the range of from 0.0:1 to 0.8:1, and is preferably in the range of from 0.0:1 to 0.1:1. The mole ratio of hydrogen (if used) to ethylene in this reactor can be in the range of from 0.001:1 to 0.3:1, preferably of from 0.005 to 0.2:1. The low molecular weight reactor operating temperature is generally in the range from 70° C. to 110° C. The mole ratio of alpha-olefin to ethylene can be in the range of from 0.0:1 to 0.6:1, preferably in the range from 0.0002:1 to 0.01:1. The mole ratio of hydrogen to ethylene can be in the range from 0.01:1 to 3:1, and is preferably in the range from 0.3:1 to 2:1.

Some blends are made in a single reactor using a mixed catalyst. In such mixed catalyst systems, the catalyst composition may include a combination of two or more Ziegler-Natta catalysts, two or more metallocene-based catalysts such as those described in U.S. Pat. Nos. 4,937,299, 5,317,036 and 5,527,752 the entire contents of which are incorporated herein by reference in their entirety, or a combination of Ziegler-Natta and metallocene catalysts. In some embodiments, a dual site metallocene catalyst may be used.

The ethylene-based polymers of the invention may be prepared in one reactor or in multiple reactors. For example, ethylene may be homopolymerized, or copolymerized with at least one comonomer, in a single or multistage slurry (tank or loop) polymerization process, in a single or multistage gas phase polymerization process, in a single or multistage solution polymerization process, or in a combination of polymerization processes, such as a slurry-gas phase polymerization process, or a gas phase-solution polymerization process. Multi-stage gas-phase processes are described in U.S. Pat. Nos. 5,047,468 and 5,149,738, the entire contents of both are incorporated herein by reference. Two or more reactors may be run in parallel or in series, or in a combination thereof.

The catalysts feed may be selected from several configurations, including, but not limited to, a supported catalyst system, a spray dried catalyst system, or a solution or liquid fed catalyst system. Polymerization catalysts typically contain a supported transition metal compound and an activator, capable of converting the transition metal compound into a catalytically active transition metal complex.

Supported catalyst configurations typically contain at least one polymerization-active metal compound with a porous support, such as porous silica. Typically, the active metal compound is impregnated within the porous metal oxide. The catalyst morphology may be modified using size classification and/or by modification of chemical properties.

Other forms of catalyst configurations include a spray dried solution or slurry system, each containing an active metal. The catalyst system may be spray dried directly into a reactor. These spray-dried systems may also include fillers, binders, slurry agents and/or activators. Examples of spray-dried catalyst systems are found in U.S. Pat. Nos. 5,589,539; 5,317,036; 5,744,556; 5,693,727; 5,948,871; 5,962,606, 6,075,101; 6,391,986; 6,069,213; 6,150,478; 6,365,659; 6,365,695; 6,251,817 and 6,426,394, which are each incorporated herein in its entirety by reference. Additional examples of these catalyst systems are described in U.S. Pat. No. 6,689,847 and U.S. Application 2003/0036613, each incorporated herein, in its entirety, by reference.

Additional catalyst configurations include active metal compounds deposited on precipitated microparticular, polymeric metal adducts to form micron-sized round particles. Examples of suitable supports include microparticulate metal alkoxides of magnesium, Group IVB metal alkoxides or aryloxide moieties. These supports may be grown in round form, with particles sizes between 5 to 50 microns. Examples of theses catalyst systems are found in U.S. Pat. No. 6,399,532 and U.S. Applications 2002/006195 and 2002/0037979, which are each incorporated herein, in its entirety, by reference.

Mixed metal catalysts systems, containing two or more catalyst types, of different molecular structure, may also be used in one reactor. For example, a mixed system containing a Ziegler-Natta type catalyst and a metallocene type catalyst, or a Ziegler-Natta type catalyst and a chromium type catalyst, may be used in one reactor. In addition, a mixed catalyst system containing two different Ziegler-Natta catalysts, two different metallocene catalysts, or two different chromium catalysts, may also be used in one reactor.

In two or more reactors, a different catalyst type may be used in each reactor. For example, a Ziegler-Natta type catalyst may be used in one reactor, and a metallocene type catalyst, or a chromium type catalyst, may be used in another reactor. Two or more reactors may also each contain a different respective Ziegler-Natta catalyst, or may each contain a different respective metallocene catalyst, or may each contain a different respective chromium catalyst.

The polymer composition is rheology modified, also known as coupled, by polyfunctional sulfonyl azides as disclosed in U.S. Pat. No. 6,521,306, incorporated herein by reference. The poly(sulfonyl azide) is any compound having at least two sulfonyl azide groups ($-SO_2N_3$) reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's, and preferably has less than 50, more preferably less than 30, most preferably less than 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane, as well as sulfonyl azide groups, when more than two polyolefin chains are to be joined. Suitable structures include R as aryl, alkyl, aryl alkaryl, arylalkyl silane, siloxane or heterocyclic, groups and other groups, which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group has more than one ring, as in the case of naphthylene bis (sulfonyl azides).

Poly(sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis (sulfonyl azido)biphenyl, 4,4'-diphenyl ether bis(sulfonyl azide) (also known as 4,4'-diphenyl oxide bis(sulfonyl azido)) and bis(4-sulfonyl azidophenyl)methane, and mixtures thereof. Most preferred is 4,4'-diphenyl oxide bis(sulfonyl azido) (also designated DPO-BSA herein).

Sulfonyl azides are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used. Polysulfonyl azides are also described in U.S. Pat. No. 6,776,924, incorporated herein in its entirety by reference.

To modify rheology, also referred to herein as "to couple," the poly(sulfonyl azide) is used in a rheology modifying amount, that is an amount effective to increase the low-shear viscosity (at <0.1 rad/s) of the polymer preferably at least about 5 percent as compared with the starting material polymer, but less than a crosslinking amount, that is an amount sufficient to result in less than 1 weight percent of gel, as measured by ASTM D2765-Procedure A. While those skilled in the art will recognize that the amount of azide sufficient to increase the low shear viscosity, and result in less than about 1 weight percent gel will depend on molecular weight of the azide used and polymer, the amount is preferably less than 5 percent, more preferably less than 2 percent, most preferably less than 1 weight percent poly(sulfonyl azide), based on total weight of polymer when the poly(sulfonyl azide) has a molecular weight from 200 to 2000 g/mol. To achieve measurable rheology modification, the amount of poly(sulfonyl azide) is preferably at least 0.0025 weight percent, more preferably at least 0.005 weight percent, most preferably at least 0.010 weight percent based on total polymer.

For rheology modification, the sulfonyl azide is admixed with the polymer and heated to at least the decomposition temperature of the sulfonyl azide. By decomposition temperature of the azide, it is meant that temperature at which the azide converts to the sulfonyl nitrene, eliminating nitrogen and heat in the process, as determined by DSC. The poly (sulfonyl azide) begins to react at a kinetically significant rate (convenient for use in the practice of the invention) at temperatures of about 130° C. and is almost completely reacted at about 160° C. in a DSC (scanning at 10° C./min). Onset of decomposition was found to be about 100° C. by Accelerated Rate Calorimetry (ARC) scanning at 2° C./hr. Extent of reaction is a function of time and temperature. At the low levels of azide, used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than 90° C., preferably greater than 120° C., more preferably greater than 150° C., most preferably greater than 180° C.

Preferred times at the desired decomposition temperatures, are times that are sufficient to result in reaction of the coupling agent with the polymer(s), without undesirable thermal degradation of the polymer matrix. Preferred reaction times in terms of the half life of the coupling agent, that is, the time required for about half of the agent to be reacted at a preselected temperature, is about 5 half lives of the coupling agent. The half life is determined by DSC In the case of a bis (sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer or copolymer it is desirable to have as homogeneous a distribution as possible, preferably achieving solubility of the azide in the polymer melt.

Preferred processes include at least one of the following: (a) dry blending the coupling agent with the polymer, preferably to form a substantially uniform admixture, and adding this mixture to melt processing equipment, for example, a melt extruder to achieve the coupling reaction, at a temperature at least the decomposition temperature of the coupling agent; (b) introducing, for example, by injection, a coupling agent in liquid form, for example, dissolved in a solvent therefore, or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer, and optionally other additives, is conveniently admixed into a second polymer or combination thereof, optionally with other additives, to modify the second polymer(s)); (d) feeding at least one coupling agent, preferably in solid form, more preferably finely comminuted, for example, powder, directly into softened or molten polymer, for example, in melt processing equipment, for example, in an extruder; or combinations thereof; (e) taking a side stream of polymer granular particles, and a solution of coupling agent in methylene chloride solvent, combining together, such that the solvent/coupling agent solution completely coats all the side stream polymer granular particles and then drying the mixture of the methylene chloride solvent. The resultant dried polymer resin has the coupling agent uniformly deposited on the resin, which then can be fed similarly with the additives per procedure (c) above. Among processes (a) through (e), processes (b), (c), and (e) are preferred, with (c) and (e) more preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature. To complete the coupling reaction concentrates are especially preferred when temperatures are sufficiently high to result in loss of coupling agent by evaporation or decomposition, not leading to reaction with the polymer, or other conditions which would result in that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form, it is preferred to mix the agent and polymer in a softened or molten state, below the decomposition temperature of the coupling agent, and then to heat the resulting admixture to a temperature at least equal to the decomposition temperature of the coupling agent. Yet another method to combine azide coupling agent with the polymer is described in U.S. Pat. No. 6,776,924 which is incorporated herein in its entirety.

The term "melt processing" is used to mean any process in which the polymer is softened or melted, such as extrusion, pelletizing, film blowing and casting, thermoforming, compounding in polymer melt form, and other melt processes.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention either higher at low angular frequency (for example, <0.1 rad/s) or about equal or lower at higher angular frequency (for example, 10 rad/s) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeneity rather than localized concentrations at the surface.

Any equipment is suitably used; preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single apparatus, that is mixing of the coupling agent and polymer takes place in the same apparatus as heating to the reaction temperature of the coupling agent. The apparatus is preferably a continuous mixer, but is also advantageously a twin screw extruder or a batch mixer/extruder system. The apparatus more preferably has at least two zones into which a reaction mixture would pass. The first zone is preferably at a temperature sufficiently high to soften the polymer and allow it to combine with the coupling agent through distributive mixing to a substantially uniform admixture and the second zone being at a temperature sufficient for reaction of the coupling agent.

To avoid the extra step and resultant cost of re-extrusion and to insure that the coupling agent is well blended into the polymer, in alternative preferred embodiments it is preferred that the coupling agent be added to the post-reactor area of a polymer processing plant. For example when polymers are prepared, in a gas phase process, the coupling agent is preferably added in either powder or liquid form to the powdered polyethylene before the densification extrusion. In an alternative embodiment, in a slurry process of producing polyethylene, the coupling agent is added in either powder or liquid form to the powdered polyethylene after the solvent is removed by decantation and prior to the drying and densification extrusion process. In an alternative embodiment when a polymer is made in a solution process, the coupling agent is preferably added to the polymer solution prior to the densification extrusion process.

In a preferred embodiment, the coupled resins are substantially gel-free. In order to detect the presence of, and where desirable, quantify insoluble gels in a polymer composition, simply soak the composition in a suitable solvent such as refluxing xylene for 12 hours as described in ASTM D 2765-90, method B. Any insoluble portion of the composition is then isolated, dried and weighed, making suitable corrections based upon knowledge of the composition.

For example, the weight of non-polymeric, solvent-soluble components is subtracted from the initial weight and the weight of non-polymeric, solvent-insoluble, components is subtracted from both the initial and final weight. The insoluble polymer recovered is reported as percent gel (percent gel) content. For purposes of this invention, "Substantially gel-free" means a percent gel content that is desirably <10 percent, more desirably <8 percent, preferably <5 percent, more preferably <3 percent, still more preferably <2 percent, even more preferably <0.5 percent and most preferably below detectable limits when using xylene as the solvent. For certain end use applications where gels can be tolerated, the percent gel content can be higher.

Preferably the inventive compositions do not contain a peroxide and/or another type of crosslinking agent. Examples of crosslinking agents are described in WO/068530, incorporated herein, in its entirety, by reference. Examples of additional crosslinking agents include phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramnidisulfides, elemental sulfur, paraquinonedioxime, dibenzoparaquinonedioxime; or combinations thereof.

The novel rheology modified composition is particularly useful in fabricating transmission or distribution pipes for water, gases and other liquids or slurries, for PE 3408 pipe performance as per ASTM D-3350 and especially pipes that equal or exceed a PE 100 performance rating. In other words, the novel composition can be used to increase the service life of the pipe. Such pipes may be formed by extruding the compositions described herein by any convenient method. U.S. Pat. No. 6,204,349, U.S. Pat. Nos. 6,191,227, 5,908,679, 5,683,767, 5,417,561 and 5,290,498 disclose various pipes and methods of making the pipes which can be used in embodiments of the invention. As such, the disclosures of all of the preceding patents are incorporated by reference in their entirety.

In the fabrication of pipe, particularly large diameter and heavy wall pipes (>2.0 inches (51 mm)), increased resistance to gravity flow induced sag is a critical need. The novel polymer resin compositions provide for increased sag resistance up to and including 4 inch (101.6 mm) thick wall pipes as per the demonstration data in Table 8. From this demonstration run, the novel polymer composition exhibits high melt strength such that all pipe sizes commonly used in the industry worldwide can be easily manufactured.

Compared to other pipe products like comparative sample (CS) F (DGDB-2480) or CS B (DGDP-2485) the novel invention resin has both the melt strength to fabricate pipes of all diameters and wall thicknesses and superior solid state performance properties (PENT, RCP, and meeting the PE-100 pipe burst testing requirements. The comparative CS F and CS B samples have excellent melt strength but inferior solid state performance properties (PENT, RCP, burst testing especially at elevated temperatures) while CS A has superior solid state performance properties but inferior melt strength. The inventive polymer composition has both superior melt strength and superior solid state performance properties solving the problem of having the best of both technologies in a single resin.

Other useful fabricated articles can be made from the novel rheology modified compositions disclosed herein. For example, molding operations can be used to form useful fabricated articles or parts from the compositions disclosed herein, including various injection molding processes (for example, that described in *Modern Plastics Encyclopedia*/89, Mid October 1988 Issue, Volume 65, Number 11, pp. 264-268, "Introduction to Injection Molding" by H. Randall Parker and on pp. 270-271, "Injection Molding Thermoplastics" by Michael W. Green, the disclosures of which are incorporated herein by reference) and blow molding processes (for example, that described in *Modern Plastics Encyclopedia*/89, Mid October 1988 Issue, Volume 65, Number 11, pp. 217-218, "Extrusion-Blow Molding" by Christopher Irwin, the disclosure of which is incorporated herein by reference), profile extrusion (that is, for pipes), calandering, pultrusion, and the like. Fibers (for example, staple fibers, melt blown fibers or spunbonded fibers (using, for example, systems as disclosed in U.S. Pat. Nos. 4,340,563, 4,663,220, 4,668,566, or 4,322,027, all of which are incorporated herein by reference), and gel spun fibers (for example, the system disclosed in U.S. Pat. No. 4,413,110, incorporated herein by reference), both woven and nonwoven fabrics (for example, spunlaced fabrics disclosed in U.S. Pat. No. 3,485,706, incorporated herein by reference) or structures made from such fibers (including, for example, blends of these fibers with other fibers, for example, polyethylene terephthalate, PET, or cotton) can also be made from the novel compositions disclosed herein.

A blow molded article of the present invention may be manufactured by blow molding the abovementioned coupled polymer composition through the use of a conventional blow molding machine, preferably an extrusion blow molding machine, employing conventional conditions. For example, in the case of extrusion blow molding, the resin temperature is typically between 180° C. and 250° C. The above mentioned coupled polymer composition having a proper temperature is extruded through a die in the form of a molten tube-shaped parison. Next the parison is held within a shaping mold. Subsequently a gas, preferably air, nitrogen or carbon dioxide, of fluorine for improved barrier performance properties, is blown into the mold so as to shape the parison according to the profile of the mold, yielding a hollow molded article. Examples of blow molded articles include bottles, drums, and automotive articles such as a fuel tank, a seat back, a head rest, a knee bolster, a glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

Adequate parison sag resistance and polymer melt strength is necessary for producing acceptable blow molded articles, especially large blow molded articles such as drums and automotive articles. If the polymer's melt strength is too low, the weight of the parison can cause elongation of the parison causing problems such as variable wall thickness and weight in the blow molded article, part blow-out, neck down and the like. Too high of a melt strength can result in rough parisons, insufficient blowing, excessive cycle times and the like.

Alternatively, the coupling can be carried out in an extruder which also forms the pipe, film, sheet, blow molded article, etc. In a blow molding machine this is preferably an extrusion blow molding machine. The polymer, a coupling amount of a sulfonyl azide and optionally additional components are introduced into the pipe, film, sheet, or blow molding extruder to form a polymer admixture. The admixture is exposed to a melt process temperature, sufficient to result in the coupling of the polymer forming a molten, coupled polymer composition. The molten, coupled polymer composition is extruded into a molten cylinder, for pipe or film or sheet or a tube-shaped parison for the formation of a blow molded article is the same as described hereinabove.

Rheology modified polymers are especially useful as blown film for better bubble stability as measured by low shear viscosity. Polymers rheology modified according to the practice of the invention are superior to the corresponding unmodified polymer starting materials for these applications due to the elevation of viscosity, of preferably at least 5 percent at low shear rates (<0.1 rad/s), sufficiently high melt strengths to avoid deformation during thermal processing or to achieve bubble strength during blow molding, and sufficiently low viscosities (measured at a shear of 10 rad/s by DMS) to facilitate molding and extrusion. Advantageous toughness and tensile strength of the starting material is maintained or improved.

Film and film structures particularly benefit from this invention and can be made using conventional blown film fabrication techniques or other, preferably biaxial, orientation processes such as tenter frames or double bubble processes. Conventional blown film processes are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19-27, and in. "Coextrusion Basics" by Thomas I.

Butler, *Film Extrusion Manual: Process, Materials, Properties* pp. 31-80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, Jun. 15-17 (1981), pp. 211-229. If a monolayer film is produced via tubular film (that is, blown film techniques) or flat die (that is, cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (*Converting Magazine* (September 1992), also discusses lamination versus coextrusion. Monolayer and coextruded films can also go through other post extrusion techniques, such as radiation induced cross-linking of the polymer and a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), PET, oriented polypropylene (OPP), ethylene/vinyl acetate (EVA) copolymers, ethylene/acrylic acid (EAA) copolymers, ethylene/methacrylic acid (EMAA) copolymers, LLDPE (linear low density polyethylene), HDPE, LDPE (low density polyethylene), nylon, graft adhesive polymers (for example, maleic anhydride grafted polyethylene), and paper. Generally, the multilayer film structures comprise from 2 to 7 layers.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodified heterogeneous polymers

EXAMPLES OF THE INVENTION

The following examples are to illustrate this invention and to not limit it. Ratios, parts, and percentages are by weight unless otherwise stated. Examples (Ex) of the invention are designated numerically while comparative samples (CS) are designated alphabetically and are not examples of the invention.

Comparative Sample A (CS A)

A polymer composition was made on two gas phase reactors in series, with a Z-N catalyst made in accordance with U.S. Pat. No. 6,187,866 and U.S. Pat. No. 5,290,745 fed to first reactor only. The HMW polyethylene component was made first. TEAL co-catalyst was fed to both reactors. The reaction conditions in the HMW or first reactor were: H2/C2 typically in the 0.015 to 0.04:1 range, C6/C2 typically in the 0.025 to 0.065:1 range. Ethylene partial pressure controlled to 20 to 60 psi (138 to 414 kPa), reaction temperature of 70 to 85° C. Isopentane or hexane condensing mode was used to control static. The reaction conditions in the second reactor are: H2/C2 of 1.6 to 2.0:1. C6/C2 of zero to 0.006:1 with a reactor temperature of 105° C. to 115° C. and ethylene partial pressure of 70 to 110 psi (483 to 758 kPa).

The HMW component has an $I_{21}$ of 0.20 to 0.5 g/10 min 0.925 to 0.932 g/cm$^3$ density hexene copolymer having a Mw/Mn of 4 to 8. The LMW component has an $I_2$ of 600 to 1000 g/10 min, 0.965 to 0.980 g/cm$^3$, hexene copolymer, having a Mw/Mn of 3.5 to 4.5. The concentration of HMW component is 55 to 65 percent of the polymer composition. Final product $I_2$ is 0.03 to 0.11 g/10 min; $I_{21}$ is 5 to 11 g/10 min; density is 0.946 to 0.951 g/cm$^3$; Mw/Mn is 22 to 35; MFR ($I_{21}/I_2$) is 80 to 150; and MFR ($I_{21}/I_5$) is 17 to 35. Estimated intrinsic viscosity at 135° C. (based on Mw SEC) for a 0.4 g/10 min $I_{21}$ is 5.6 to 7.2 dg/l and for 500 MI is 0.5 to 0.7 dg/l. Mw for HMW is ~225,000 g/mol. This product is CS A.

Reactor conditions for making the CS A resin are shown in Table 1, where the abbreviation APS means average particle size.

TABLE 1

Process Conditions Used to Make CS A.

| Reactor Conditions | HMW Component | LMW Component |
|---|---|---|
| Temperature, ° C. | 180 | 110 |
| Pressure, psig (kPag) | 282 (1944) | 421 (2903) |
| C2 PP, psia (kPaa) | 40.3 (278) | 100.3 (692) |
| H2 to C2 ratio | 0.028 | 1.79 |
| C6 to C2 ratio | 0.058 | 0.003 |
| N2, mole % | 75.9 | 29.4 |
| H2, mole % | 0.378 | 41.3 |
| C2H4, mole % | 13.6 | 23 |
| C2H6, mole % | 0.887 | 3.99 |
| C4H8, mole % | 0.006 | 0.02 |
| IC5, mole % | 8.56 | 2.31 |
| C6H12, mole % | 0.79 | 0.058 |
| Hexane, mole % | 0 | 0.069 |
| Triethylaluminum (TEAL) Flow, lb/h (kg/h) | 9.9 (4.49) | 4.3 (1.95) |
| Production Rate, klb/h (Mg/h) | 48.1 (21.8) | 35.2 (16.0) |
| UCAT-J Feed, lb/h (kg/h) | 18.0 (8.16) | 0 (0) |
| C2 Feed, klb/h (Mg/h) | 47.0 (21.3) | 35.2 (16.0) |
| C6 Feed, lb/h (kg/h) | 1140 (517) | 0.019 (0.00862) |
| H2 Feed, lb/h (kg/h) | 0.66 (0.30) | 112.8 (51.2) |
| N2 Feed, lb/h (kg/h) | 1202 (545) | 384 (174) |
| IC5 Feed, lb/h (kg/h) | 880 (399) | 2 (0.91) |
| C6 to C2 flow ratio | 0.024 | 0.001 |
| Vent Flow, lb/h (kg/h) | 5 (2.27) | 40 (18.1) |
| Bed Weight, klb (Mg) | 94.8 (43.0) | 193 (87.5) |
| Upper fluidized bulk density (FBD), lb/ft$^3$ (kg/m$^3$) | 12.8 (205) | 18.1 (290) |
| Lower FBD, lb/ft$^3$ (kg/m$^3$) | 13.9 (223) | 20.6 (330) |
| Bed Level, ft (m) | 37.2 (11.3) | 46.5 (14.2) |
| Residence Time, h | 2 | 2.3 |
| Space time yield (STY), lb/(h ft$^3$) [(kg/(h m$^3$))] | 7.1 [114] | 3.8 [60.9] |
| Superficial gas velocity (SGV), ft/s (m/s) | 1.78 (0.543) | 1.87 (0.570) |
| Percent Condensing, wt % | 6.33 | 0 |
| Production Rate Split, wt % | 57.8 | 42.2 |

TABLE 1-continued

Process Conditions Used to Make CS A.

| Reactor Conditions | HMW Component | LMW Component |
|---|---|---|
| Ti, μg/g | 2.62 | 1.47 |
| Al to Ti ratio | 81.8 | 93.4 |
| Melt Flow rate ($I_5$), g/10 min | — | 0.35 |
| Melt Flow rate ($I_{21}$), g/10 min | 0.39 | 7.84 |
| Flow Rate Ratio, $I_{21}/I_5$ | — | 22.5 |
| Density, kg/m³ | 927.8 | 948.9 |
| Bulk Density, lb/ft³ (kg/m³) | 23.6 (378) | 26.7 (428) |
| Average particle size (APS), in (mm) | 0.028 (0.711) | 0.030 (0.762) |
| Percent Fines, wt % | 2.4 | 3 |

Samples of CS A were coupled with DPO-BSA in the form with preferred process (c) or (e), in the range of 75 to 200 μg/g with 125 to 155 μg/g being the most preferred level. There are no gels formed as exhibited by the high FAR ratings and the phosphate additive is not usually consumed. Product does need special technology for improvement of FAR up to acceptable levels of +20 or better based on the reactor technology not the azide chemistry technology. This can be accomplished as taught in U.S. Pat. No. 6,485,662 incorporated herein by reference. Product does provide both a PE 3408 type pipe performance and a MRS 10 type pipe performance according to ISO 9080 which with the excellent PENT and bench top RCP values is otherwise defined as PE 100 performance as shown in Table 2 through Table 4.

The novel resin composition embodies both superior melt strength or sag resistance to enable the formation of all pipe diameters and wall thicknesses as commonly found in the industry standards worldwide and superior solid state performance properties. The demonstration run exemplifies the superior nature of the melt strength as up to 4 inch (100 mm) wall pipe could be produced against comparative samples CS B or F which are known to those in the art as having exemplary melt strength. Another evidence of the superiority in melt strength of the novel composition is the nearly 10 fold improvement in viscosity at $10^{-5}$ $s^{-1}$ shear rate (FIG. 1). From calculations of the velocity profile from gravity flow that is known to those skilled in the art, it is calculated that the velocity of the resin results in a shear rate in the $10^{-5}$ region. Thus, the viscosity measurement show that the novel composition polymers have even slightly higher viscosity than the comparative samples CS B or F which was validated in the demonstration run data.

The novel resin composition also consists of superior performance properties needed for PE 100 performance. PENT values in excess of 10,000, and even in excess of 15,000 hours, at the accelerated PENT testing condition with 3.0 MPa demonstrate the outstanding slow crack growth resistance and about a 100 fold improvement over the melt strength of industry leading pipe resins. Impact strength per F-2231 also demonstrates substantial four times improvement of over of the melt strength industry leading pipe resins. The CS A sample while having excellent solid state performance has poorer melt strength and can not produce the heavy wall pipes as above.

Thus, pipe manufactures have been continuously looking for a resin that has both outstanding melt strength and outstanding solid state performance properties. The novel composition resin now solves this problem in a single resin.

TABLE 2

Fundamental Property Data of Control and Invention Resin Examples

|  | CS A | Example 1 | CS A | Example 2 | Example 3 | CS B or F (Commercial Sample) |
|---|---|---|---|---|---|---|
| Coupling Conditions |  |  |  |  |  |  |
| Nominal Azide Level (ppm) | 0 | 100 | 0 | 100 | 150 | not applicable |
| Azide calculated from Sulfur Analysis, μg/g | 0 | 148 | 0 | 107 | 141 | — |
| Melt Temperature, °C. | 225 | 235 | 258 | 268 | 270 | — |
| Production Rate, kg/h | 186 | 186 | 16,560 | 16,560 | 17,510 | — |
| Gate Position, % open | 20 | 20 | 41 | 41 | 39 | — |
| Fundamental Resin Properties |  |  |  |  |  | — |
| Melt Flow Rate, $I_2$, g/10 min | 0.07 | 0.03 | 0.07 | 0.04 | 0.03 | — |
| Melt Flow Rate, $I_5$, g/10 min | 0.26 | 0.15 | 0.28 | 0.18 | 0.12 | 0.27 |
| Melt Flow Rate, $I_{10}$, g/10 min | 1.06 | 0.74 | 1.10 | 0.86 | 0.62 | — |
| Melt Flow Rate, $I_{21}$, g/10 min | 6.47 | 4.7 | 6.4 | 5.3 | 4.9 | 8.4 |
| Melt Flow ratio, $I_{21}/I_5$ | 24.9 | 31.3 | 23.3 | 29.4 | 40.8 | 31 |
| Melt Flow ratio, $I_{21}/I_2$ | 98.0 | 146.9 | 91.4 | 132.5 | 163.3 | — |
| Melt Flow ratio, $I_{10}/I_2$ | 16.1 | 23.2 | 15.7 | 21.5 | 20.7 | — |
| Density, g/cc | 0.9499 | 0.9494 | 0.9489 | 0.9483 | 0.9479 | 0.9454 |
| Antioxidant Levels |  |  |  |  |  |  |
| Active Irganox - 1010, μg/g | 1,137 | 1,021 | 1,119 | 1,442 | 1,464 | — |
| Total Phosphire, μg/g | 1,245 | 1,023 | 1,220 | 1,178 | 1.065 | — |
| Active Phosphite, μg/g | 1,101 | 936 | 1,162 | 1,119 | 1,009 | — |
| Inactive Phosphite, μg/g | 144 | 87 | 59 | 59 | 56 | — |
| Percent Active Phosphite | 88 | 91 | 95 | 95 | 95 | — |

TABLE 3

Structural Property Data of Control and Invention Resin Examples

|  | CS A | Example 1 | CS A | Example 2 | Example 3 |
|---|---|---|---|---|---|
| DSC Data | | | | | |
| Melting Point, °C. | 130.5 | 130.9 | 130.8 | 131.0 | 131.0 |
| Heat of Fusion, J/g | 209 | 206 | 197 | 190 | 190 |
| Crystallization Point, °C. | 117.1 | 117.2 | 117.0 | 116.6 | 116.8 |
| Heat of Crystallization, J/g | 202 | 207 | 195 | 190 | 189 |
| Thermal Stability, °C. | 250.1 | 244.5 | 248.3 | 249.7 | 243.5 |
| ATREF Data | | | | | |
| HD Fraction, % | 80.6 | 79.8 | 78.6 | 80.8 | 81.1 |
| Purge Fraction, % | 9.5 | 10.3 | 10.9 | 10.1 | 9.7 |
| Purge $M_v$ | 77,800 | 84,000 | 109,000 | 102,000 | 114,000 |
| $M_v$ ave | 116,000 | 117,000 | 123,000 | 135,000 | 134,000 |
| SCB $M_v$ | 120,000 | 121,000 | 125,000 | 139,000 | 136,000 |
| GPC Data | | | | | |
| Conventional GPC | | | | | |
| $M_n$, g/mol | 12,250 | — | 6,210 | 6,870 | 5,840 |
| $M_w$, g/mol | 225,600 | — | 200,840 | 214,800 | 259,000 |
| $M_z$, g/mol | 985,000 | — | 983,100 | 1,030,000 | 1,320,000 |
| $M_w/M_n$ | 18.4 | — | 32.3 | 31.3 | 44.3 |
| Absolute GPC | | | | | |
| $M_n$, g/mol | 14,500 | 14,100 | 8,162 | 11,023 | 8,868 |
| $M_w$, g/mol | 256,000 | 258,600 | 202,200 | 208,350 | 240,000 |
| $M_z$ (BB), g/mol | 1,042,500 | 1,108,000 | 889,000 | 925,500 | 1,145,000 |
| $M_z$ (abs), g/mol | 1,224,000 | 1,310,000 | 927,000 | 929,600 | 1,053,000 |
| $M_{z+1}$, g/mol | 1,900,000 | 2,004,000 | 1,628,000 | 1,736,000 | 2,079,000 |
| $M_z/M_w$ | 4.78 | 5.07 | 4.59 | 4.46 | 4.39 |
| Rheology RMS Data | | | | | |
| Viscosity at $10^{-2}$ sec$^{-1}$, Pa s | 179,000 | 336,000 | 157,000 | 272,000 | 340,000 |
| Viscosity at $10^{+2}$ sec$^{-1}$, Pa s | 2,821 | 2,796 | 2,751 | 2,646 | 2,699 |
| Ratio of (Visc at $10^{-2}$ sec$^{-1}$)/(Visc at $10^{+2}$ sec$^{-1}$) | 63 | 120 | 57 | 103 | 126 |
| G'/G" at $10^{-2}$ sec$^{-1}$ | 0.35 | 0.71 | 0.34 | 0.69 | 0.79 |
| G'/G" at $10^{-1}$ sec$^{-1}$ | 0.51 | 0.77 | 0.50 | 0.73 | 0.82 |

TABLE 4

Physical Property Data of Control and Invention Resin Examples

| Properties | CS A | Example 1 | CS A | Example 2 | Example 3 | CS B or F (Commercial Sample) |
|---|---|---|---|---|---|---|
| Tensile Strength at Break, psi (MPa) | 5,700 (39.3) | 5,660 (39.0) | 5,820 (40.1) | 5,220 (36.0) | 5,260 (36.3) | — |
| % Elongation at Break | 770 | 700 | 680 | 660 | 705 | 850 |
| Yield Strength, psi (MPa) | 3,512 (24.2) | 3,620 (25.0) | 3,150 (21.7) | 3.030 (20.9) | 2,910 (20.1) | 3,200 (22.1) |
| % Elongation at Yield | — | — | 4.6 | 4.1 | 3.9 | — |
| Flexural Modulus, kpsi (GPa) | 173 (1.19) | 171 (1.18) | 179 (1.23) | 171 (1.18) | 184 (1.27) | 120 (0.827) |
| 1% Secant Modulus, kpsi (GPa) | 149 (1.03) | 122 (0.841) | 153 (1.05) | 154 (1.06) | 152 (1.05) | — |
| 2% Secant Modulus, kpsi (GPa) | 125 (0.862) | 144 (0.993) | 127 (0.876) | 128 (0.883) | 127 (0.876) | — |
| PENT, h at 3.0 MPa | 6000 to 9990 | >15,500 | — | — | >6000 | <200 |
| Bench Top RCP, kJ/m$^2$ | 400 | 453 | — | — | — | 108 |
| Burst Performance | — | — | — | — | — | — |
| 100,000 h intercept at 23° C., psi (MPa) | — | 1,590 (11.0) | — | — | 1,530 (10.5) | * |
| 100,000 h intercept at 60° C., psi (MPa) | — | 1,067 (7.36)** | — | — | 1,057 (7.29)** | *** |
| 100,000 h intercept at 80° C., psi (MPa) | — | 706 (4.87) | — | — | 778 (5.43) | — |

TABLE 4-continued

Physical Property Data of Control and Invention Resin Examples

| Properties | CS A | Example 1 | CS A | Example 2 | Example 3 | CS B or F (Commercial Sample) |
|---|---|---|---|---|---|---|
| 50 year intercept at 23° C., MPa | — | 10.6 | — | — | 10.1 | — |
| 50 year intercept at 60° C., MPa | — | 7.2 | — | — | 7.1 | — |
| 50 year intercept at 80° C., MPa | — | 4.5 | — | — | 5.1 | — |
| Film Appearance Rating (FAR) | 40 | 40 | 40 | 50 | 50 | — |

*Meets Cell Class 345464C per ASTM D-3350;
**Meets 1000 psi (6.89 MPa) hydrostatic design basis at 60° C.;
*** Meets 800 psi (5.51 MPa) hydrostatic design basis at 60° C.

The pipe burst performance data listed in Table 4 was generated on pipes prepared per the extrusion conditions listed in the following Tables 5 and 6 and tested per ASTM D 1598 and analyzed per ASTM D 2837-99 and ISO 9080-99.

TABLE 5

Inventive Resin Pipe Extrusion Conditions for Burst Testing

| Property | Example 1 | Example 3 |
|---|---|---|
| 0092 CB MB, wt % | 6.50 | 6.50 |
| Heat Zone Temps | | |
| Zone 1, ° F. (° C.) | 350 (177) | 380 (193) |
| Zone 2, ° F. (° C.) | 370 (188) | 390 (199) |
| Zone 3, ° F. (° C.) | 380 (193) | 400 (204) |
| Zone 4, ° F. (° C.) | 390 (199) | 410 (210) |
| Zone 5, ° F. (° C.) | 400 (204) | 438 (226) |
| Die, ° F. (° C.) | 409 (209) | — |
| Melt-Probe, ° F. (° C.) | 425 (218) | — |
| Barrel Pressure | | |
| Head (highest), psig (MPag) | 2080 (14.3) | 2090 (14.4) |
| Head (lowest), psig (MPag) | 2020 (13.9) | 2030 (14.0) |
| Screw Speed, rpm | 62 | 70 |
| Motor Volts, volts | 200 | 230 |
| Motor Amps, % Full Load | 47 | 40 |
| Puller Speed, ft/min (m/min) | 9.3 (2.8) | 9.5 TO 9.7 (2.9 TO 3.0) |
| Rate, lb/h (kg/h) | 119.2 (54.1) | 121.2 (55.0) |
| Pressure, in Hg (kPag) | 10 (33.9) | 9 (30.5) |
| OD Gloss | Ok | Good |
| ID Gloss | Ok | Very Good |
| OD Roughness | Ok | Good |
| ID Roughness | Ok | Good |
| Gels | No | No |
| Die Plate Out | Ok | |
| Smoking | Normal | Normal |
| Odor | Normal | Normal |
| Pipe Dimension | | |
| OD, in (mm) | 1.325 to 1.328 (33.65 to 33.73) | 1.328 to 1.332 (33.73 to 33.83) |
| Wall (highest), in (mm) | 0.130 (3.30) | 0.129 (3.28) |
| Wall (lowest), in (mm) | 0.115 (2.92) | 0.124 (3.15) |

TABLE 6

Inventive and Control Resin Pipe Extrusion Conditions for Burst Testing

| Property | Example 1 | Control A |
|---|---|---|
| 0092 CB MB, wt % | 6.5 | 6.5 |
| PA, wt. percent | 2.1 | 2.1 |
| Heat Zone Temps | Actual | Actual |
| Zone 1, ° F. (° C.) | 350 (177) | 350 (177) |
| Zone 2, ° F. (° C.) | 370 (188) | 370 (188) |
| Zone 3, ° F. (° C.) | 380 (193) | 380 (193) |
| Zone 4, ° F. (° C.) | 390 (199) | 390 (199) |
| Zone 5, ° F. (° C.) | 400 (204) | 404 (207) |
| Die, ° F. (° C.) | 409 (209) | 409 (209) |
| Melt-Probe, ° F. (° C.) | 425 (218) | 427 (219) |
| Barrel Pressure | | |
| Head (highest), psig (MPag) | 2080 (14.3) | 2030 (14.0) |
| Head (lowest), psig (MPag) | 2020 (13.9) | 1980 (13.7) |
| Screw Speed, rpm | 62.25 | 62.28 |
| Motor Volts, volts | 200 | 200 |
| Motor Amps, % Full Load | 47 | 47 |
| Puller Speed, ft/min (m/min) | 9.3 (2.8) | 9.3 (2.8) |
| Rate, lb/h (kg/h) | 119.2 (54.1) | 116.3 (52.8) |
| Pressure, in Hg (kPag) | 10 (33.9) | 5 (16.9) |
| OD Gloss | Ok | Dull |
| ID Gloss | Ok | Ok |
| OD Roughness | Ok | Ok |
| ID Roughness | Ok | Ok |
| Gels | No | No |
| Die Plate Out | Ok | Some build-up |
| Smoking | Normal | Normal |
| Odor | Normal | Normal |
| Pipe Dimension | | |
| OD, in (mm) | | |
| Wall (highest), in (mm) | 0.130 (3.30) | 0.131 (3.33) |
| Wall (lowest), in (mm) | 0.120 (3.05) | 0.122 (3.10) |

Examples 2 and 3

Comparative Sample B: Large Diameter, Heavy Wall Pipe Extrusion Demonstration Pipes were prepared from CS B and Examples 2 and 3 as shown in Table 5. CS B is a commercial pipe resin DGDP-2485. CS F or DGDB-2480 embodies the same pipe technology as CS B. DGDP-2485 is a chrome catalyzed pipe product and is made in accordance with U.S. Pat. No. 6,022,933 which is included by reference in this patent in its entirety. Examples 2 and 3 are CS A resin coupled with nominal azide levels of 100 and 150 μg/g, respectively. The equipment used was a standard smooth barrel extruder (30 to 1 L/D) with five barrel heat zones. The die used had an internal diameter of 24.89 in (0.6322 m) and a mandrel size of 19.99 in (0.5079 m). Pressure sizing method was employed to form the pipe.

The pressure sizing method for large diameter pipe is one in which a series of floating plugs is employed to seal and about 12 psi (82.7 kPa) of gas pressure is used to force the resin up against the sizing sleeve. The pressure can be maintained or changed by adjusting the opening of a smaller valve that is attached to the end plug. This also allows for inflow and exhausting of gas from the interior of the pipe during cooling. Due to the relative smaller internal volume of the 24 in (0.61 m) pipe size, heat dissipation inside smaller sizes heavy wall pipe is even harder to control compared to that of the larger sizes with the same wall thickness, for example, 24 in (0.61 m) SDR (Standard Dimension Ratio) 7.3 versus 36 in (0.914 m) SDR 11 having similar wall thickness. SDR is equal to the outside diameter divided by the minimum wall thickness. Therefore this 24 inch (0.61 m) heavy wall trial was the ultimate test for this pipe resin. It is said that any pipe resin that can be successfully made into 24 inch (0.61 m) heavy wall pipe using pressure sizing method can most likely be successfully made into larger size pipes with at least equal or heavier wall thickness.

The pipe extrusion line used for this trial has a sizing chamber of 8 feet 2 in length (2.39 m) and the gap between the sizing box to the water spray chamber is 10 feet 3 in (3.12 m). The water spray chamber is 57 feet long (17.4 m). No further cooling takes place after this chamber except by ambient cooling. Cooling water was 60° F. (15.6° C.) which is reasonably consistent year round. Vacuum sizing is not employed in these large sizes due to its cost and pipe buoyancy issues.

Extrusion of Example 2 produced pipe that was within the wall thickness tolerance of the 24 in (0.61 m) SDR 7.3 (3.3 in (84 mm) wall) size. Switching to the Example 3 for the same pipe size also produced pipe within specification. Moving to SDR 6 (4.0 in (100 mm) wall) resulted in a uniform wall thickness around the entire pipe diameter.

Inventive resin pipe fabrication observations as are follows. 1) The temperature profile for the inventive resins versus an industry standard resin DGDP-2485 needed to be lowered in the front end to 350° F. (177° C.) and then on the last two sections 325° F. (163° C.). 2) The extruder speed was adjusted from 35 rpm for the DGDP-2485 to about 47 rpm for the inventive resins. 3) Head pressures remained the same and electrical current was equal to 20 less on a base of 380 amperes for the DGDP-2485 resin. 4) Melt temperature increased from 388 to 403° F. (198 to 227° C.). 5) Outer pipe surface was unchanged. 6) Wall thickness was within specifications for both Example 2 and Example 3 and the pounds per foot of pipe was about 92 (302 kg/m).

The die settings used are listed in Table 7.

TABLE 7

| Die Gap Settings | |
| --- | --- |
| Position | Die Gap |
| Top | 3.03 in (0.0770 m) |
| 3 o'clock | 2.53 in (0.0643 m) |
| Bottom | 1.92 in (0.0488 m) |
| 9 o'clock | 2.35 in (0.0597 m) |

The die has a floating bushing so the top, bottom and both sides can be adjusted. In this trial only necessary adjustments were made to make the top and bottom uniform enough (for example, eccentricity less than 12%) for the melt strength assessment. The pipe wall thickness variation was within the tolerance for the pipe size. The die gap separation from top to bottom were defined as normal for this size. Pipe hot outside diameter and final outside diameter were within the expected ranges.

Total output rate was 780 lb/h (353 kg/h) for SDR 7.3 pipe, and 650 lb/h (295 kg/h) for SDR 6 and 5 pipe.

The large diameter heavy wall pipe extrusion conditions and pipe dimensions are given in Table 8. The data in Table 8 was generated using a die size of 23.892 inches (0.607 m), a mandrel size of 19.998 inches (0.508 m), and a "former size" of 24.678 inches (0.601 m).

TABLE 8

| Large Diameter, Heavy Wall Pipe Extrusion Demonstration and Wall Thickness Eccentricity Data. | | | | | |
| --- | --- | --- | --- | --- | --- |
| Resin | 24 in (0.610 m) SDR 7.3 CS B | 24 in (0.610 m) SDR 7.3 Example 2 | 24 in (0.610 m) SDR 7.3 Example 3 | 24 in (0.610 m) SDR 6.0 Example 3 | 24 in (0.610 m) SDR 5.0 Example 3 |
| Extruder Speed, rpm | 35.1 | 46.7 | 46.7 | 46.7 | 46.7 |
| Takeoff, in/min (mm/min) | 1.74 (44.2) | 1.74 (44.2) | 1.74 (44.2) | 1.08 (27.4) | 1.03 (26.2) |
| Rate, lb/h (kg/h) | 772 (350) | 778 (353) | 780 (354) | 650 (295) | 650 (295) |
| Extruder Temp. ° F. (° C.) | 380 (193) | 360 (182) | 360 (182) | 360 (182) | 360 (182) |
| Heat Pressure, psig (MPag) | 4453 (30.7) | 4464 (30.8) | 4464 (30.8) | 4226 (29.1) | 4226 (29.1) |
| Barrel Temp. ° F. (° C.) | 411, 392, 369, 350, 300, 300 (211, 200, 187, 177, 149, 149) | 350, 350, 350, 350, 325, 325 (177, 177, 177, 177, 163, 163) | 350, 350, 350, 350, 325, 325 (177, 177, 177, 177, 163, 163) | 350, 350, 350, 350, 325, 325 (177, 177, 177, 177, 163, 163) | 350, 350, 350, 350, 325, 325 (177, 177, 177, 177, 163, 163) |
| Melt Temp. ° F. (° C.) | 388 (198) | 420 (216) | 403 (206) | 403 (206) | 403 (206) |
| Oil Heater Temp. ° F. (° C.) | 405 (207) | 380 (193) | 390 (199) | 390 (199) | 390 (199) |
| Dryer Temp. ° F. (° C.) | 125 (51.7) | 100 (37.8) | 125 (51.7) | 125 (51.7) | 125 (51.7) |
| Dryer Rate, lb/h (kg/h) | 772 (350) | 780 (354) | 780 (354) | 650 (295) | 650 (295) |
| Air (OD Control), psig (kPag) | 12 (82.7) | 12 (82.7) | 12 (82.7) | 11.6 (80) | 11.6 (80) |
| Calling Guage, psig (kPag) | 3.0 (20.7) | 3.0 (20.7) | 5.0 (34.5) | 7.0 (48.3) | 7.0 (48.3) |
| Hot OD, mm | 625.7 | 626 | 626 | 624.25 | 624.25 |
| Wall Thickness, mm | 12 o'clock = 84.80 | 12 o'clock = 83.28 | 12 o'clock = 82.64 | 12 o'clock = 108.68 | 12 o'clock = 121.40 |
| Wall Thickness, mm | 1 o'clock = 86.00 | 1 o'clock = 85.12 | 1 o'clock = 86.65 | 1 o'clock = 111.50 | 1 o'clock = 119.07 |
| Wall Thickness, mm | 2 o'clock = 88.25 | 2 o'clock = 90.88 | 2 o'clock = 87.92 | 2 o'clock = 111.30 | 2 o'clock = 127.31 |

TABLE 8-continued

Large Diameter, Heavy Wall Pipe Extrusion Demonstration and Wall Thickness Eccentricity Data.

| Resin | 24 in (0.610 m) SDR 7.3 CS B | 24 in (0.610 m) SDR 7.3 Example 2 | 24 in (0.610 m) SDR 7.3 Example 3 | 24 in (0.610 m) SDR 6.0 Example 3 | 24 in (0.610 m) SDR 5.0 Example 3 |
|---|---|---|---|---|---|
| Wall Thickness, mm | 3 o'clock = 87.90 | 3 o'clock = 91.22 | 3 o'clock = 87.37 | 3 o'clock = 106.92 | 3 o'clock = 144.30 |
| Wall Thickness, mm | 4 o'clock = 88.00 | 4 o'clock = 88.17 | 4 o'clock = 85.40 | 4 o'clock = 101.10 | 4 o'clock = 163.50 |
| Wall Thickness, mm | 5 o'clock = 87.88 | 5 o'clock = 86.63 | 5 o'clock = 86.86 | 5 o'clock = 102.52 | 5 o'clock = 180.10 |
| Wall Thickness, mm | 6 o'clock = 87.60 | 6 o'clock = 85.75 | 6 o'clock = 87.54 | 6 o'clock = 102.08 | 6 o'clock = 181.60 |
| Wall Thickness, mm | 7 o'clock = 85.60 | 7 o'clock = 90.44 | 7 o'clock = 90.35 | 7 o'clock = 107.10 | 7 o'clock = 169.50 |
| Wall Thickness, mm | 8 o'clock = 86.96 | 8 o'clock = 91.61 | 8 o'clock = 91.81 | 8 o'clock = 108.32 | 8 o'clock = 158.90 |
| Wall Thickness, mm | 9 o'clock = 87.00 | 9 o'clock = 91.78 | 9 o'clock = 89.30 | 9 o'clock = 108.16 | 9 o'clock = 148.44 |
| Wall Thickness, mm | 10 o'clock = 86.70 | 10 o'clock = 87.33 | 10 o'clock = 84.87 | 10 o'clock = 103.70 | 10 o'clock = 143.55 |
| Wall Thickness, mm | 11 o'clock = 85.70 | 11 o'clock = 85.27 | 11 o'clock = 83.30 | 11 o'clock = 102.46 | 11 o'clock = 131.03 |
| Eccentricity, % | 3.91 | 9.26 | 9.99 | 9.33 | 34.43 |

The improvement in the pipe characteristics is believed due to the nearly 10-fold increase in melt viscosity of the coupled composition at very low shear rates of $10^{-5}$ to $10^{-6}$ rad/s as shown in FIG. 1.

As described in the description of the Test Methods, the steady-state data from the creep measurement was combined with the viscosity curve from DMS to extend the accessible range of shear rates down to 1-6 $s^{-1}$, and fitted with the 4-parameter Carreau-Yasuda model per the previously defined equation 11.

$$\eta = c_1(1+(c_2 x)^{c3})^{(c4-1)/c3} \qquad (11)$$

The Carreau-Yasuda parameter values are given in Table 9.

TABLE 9

Calculated Carreau-Yasuda Parameter Values

| | CS B 190° C. | CS B 170° C. | CS A 190° C. | CS A 170° C. | Example 2 190° C. | Example 2 170° C. | Example 3 190° C. | Example 3 170° C. |
|---|---|---|---|---|---|---|---|---|
| C1 | 4.30E+07 | 3.01E+07 | 6.51E+05 | 6.97E+05 | 2.54E+07 | 1.92E+07 | 1.17E+08 | 6.12E+07 |
| C2 | 4.6077 | 2.8825 | 0.133 | 0.06784 | 0.03329 | 0.206 | 9.7602 | 3.8445 |
| C3 | 0.09971 | 0.1089 | 0.2008 | 0.2101 | 0.1036 | 0.1183 | 0.09939 | 0.1117 |
| C4 | 0.04443 | 0.01273 | −0.1174 | −0.2569 | −0.2494 | −0.1685 | 0.03307 | −0.02598 |

TABLE 10

Comparison of Inventive and Control Resin Extrusion Conditions and Film Performance
ALPINE FILM EXTRUSION LINE DATA

| Product | CS C | CS A | Example 2 | Example 3 |
|---|---|---|---|---|
| Nominal Azide Level, µg/g | Not applicable | 0 | 100 | 150 |
| Melt Temperature, ° F. (° C.) | 409 (209) | 410 (210) | 410 (210) | 410 (210) |
| Screw Current, amperes | 63 | 76 | 78 | 78 |
| Pressure, psig (MPag) | 5590 (38.5) | 5940 (40.9) | 5760 (39.7) | 5570 (38.4) |
| Rate, lb/h (kg/h) | 99.9 (45.3) | 100.1 (45.4) | 100.8 (45.7) | 100.4 (45.5) |
| Screw speed, rev/min | 81.8 | 86.5 | 86.5 | 85.9 |
| 0.5 mil (13 µm) Dart, gram | 333 | 363 | 471 | 135 |
| 1.0 mil (25 µm) Dart, gram | 278 | 390 | 414 | 216 |
| Vertical Bubble Stability ft/min (m/s) | 350 (1.78) | — | 350 (1.78) | 350 (1.78) |
| Side-to-Side Bubble Stability, pass/fail | Pass | Fail | Pass | Pass |
| FAR | 40 | 40 | 50 | 50 |

Film Example

Films were produced from the CS C and CS A resins and also from the resin from Examples 2 and 3 as shown in Table 10. The films were made with the process conditions listed in Table 10 with the equipment and process conditions in the bubble stability test method section above.

The azide modification improved the bubble stability to commercially acceptable levels. What was unexpected was that the dart impact of the resin of Example 2 showed superior dart impact levels to the comparative CS C resin giving a superior bubble stability/dart impact combination. Example 2 when extruded into film resulted in equivalent bubble stability at high levels and dart impact improvements over an industry standard of 40 to nearly 50 percent on 0.5 and 1.0 mil (12.5 and 25 μm) film respectively and nearly 30 and 5 percent over the CS A control resin on 0.5 and 1.0 mil (12.5 and 25 μm) film respectively. Therefore, the invention improves bubble stability with increased dart impact levels. Resin of Example 3 was found to have inferior dart impact. So there is an optimum window of coupling that achieves this improvement. From a resin utility perspective at low shear rates the viscosity was improved by an order of magnitude without sacrificing extrudability and the solid state performance properties were retained or improved. The further unexpected results were that the coupling reaction did not interfere with the stabilization package and no gels were developed in the pelleting process.

Fabricators are always looking for improved solid state performance properties at equivalent or improved processability. Example 2 solves this problem by having an improved bubble stability/dart impact combination. This can potentially lead to down-gauged films.

Blow Molded Article Example

Azide coupling post reactor modification of resins aids blow molding by increasing melt strength and decreasing parison sag. This allows the production of large parts at down gauged wall thickness. Moreover, the resin's improved stiffness allows vertical stacking of 5 drums versus the 3 drums limit of incumbent standard blow molding resins. The higher density improves stiffness without sacrificing ESCR performance, which is possible because the new resin design has selectively increased comonomer in the HMW component.

The improved combination of properties obtained by the inventive resin (Examples 2 and 3) are demonstrated in Table 11 and FIGS. 2 and 3. The comparison of viscosity at low shear (0.02 rad/s frequency) in FIG. 2 shows that the inventive resins have improved or equivalent sag resistance to incumbent large part blow molded (LPBM) products. The decrease in the inventive resin tan delta (FIG. 3) is the result of increased cross-linking accompanied by an increase in elasticity and melt strength on coupling. The inventive resins have improved processability (Table 11) as demonstrated by the inherent low swell (allows greater control of parison programming, faster line speed) of the Ziegler-Nata resins, greater shear thinning (ratio of viscosity at 0.02 rad/s to viscosity at 200 rad/s) and higher melt flow ratio, broader molecular weight distribution, imparted by the bimodal design combined with azide coupling. The inventive resins have better impact properties and a superior balance of ESCR-stiffness compared to the existing products.

TABLE 11

Comparison of "Superior Processing/ESCR/Stiffness Balance" of Inventive Examples to Control Samples for the Blow Molding Application

| Property | Example 2 | Example 3 | CS A | CS D | CS E |
|---|---|---|---|---|---|
| Density, g/cc | 0.9483 | 0.9479 | 0.9489 | 0.9545 | 0.9524 |
| Melt Flow rate, $I_{21}$, g/10 min | 5.3 | 4.9 | 6.4 | 5.6 | 15.1 |
| Melt Flow rate, $I_5$, g/10 min | 0.18 | 0.12 | 0.28 | 0.16 | 0.64 |
| Flow rate ratio, $I_{21}/I_5$ | 29 | 41 | 23 | 36 | 24 |
| Swell @ $t_{1000}$, s | 4.8 | 5.0 | 4.5 | 8.5 | 9.7 |
| Swell @ $t_{300}$, s | 14.6 | 15.6 | 14.1 | 28.1 | 28.3 |
| Viscosity at 0.02 $s^{-1}$, Pa s | 202,719 | 249,106 | 147,464 | 256,210 | 117,262 |
| Ratio of (Visc at 0.02 $s^{-1}$)/(Visc at 200 $s^{-1}$) | 133 | 161 | 88 | 185 | 110 |
| Izod impact, ft lb/in (N m/m) at 23° C. | 14.9 (796) | 15.6 (833) | 14.8 (790) | — | 5.59 (299) |
| Izod impact, ft lb/in (N m/m) at −40° C. | 8.50 (454) | 7.02 (375) | 6.24 (33.3) | — | 2.00 (107) |
| Tensile Impact, ft lb/in$^2$ (kNm/m$^2$) | 324 (679) | 332 (696) | 279 (585) | 277 (581) | 185 (388) |
| 2% Secant Modulus, kpsi (GPa) | 128 (0.883) | 127 (0.876) | 127 (0.876) | 153 (1.05) | 136 (0.938) |
| Flexural Modulus, kpsi (GPa) | 171 (1.18) | 184 (1.27) | 179 (1.23) | 223 (1.54) | 199 (1.37) |
| ESCR, F50, 10% Igepal, h | >1000 | >1000 | >1000 | 167 | 110 |

Azide Coupling of Cr-Catalyzed Resin

The following is the description of the reaction process, along with the pelleting process and the product description, each embodying the technology invention for thick sheet extrusion and thermoforming, and, in particular, thermoforming sheet grade HDPE resin. Other applications may include blow molding of the resin to large size containers, and the preparation of films and pipes. Each application will benefit from improved melt strength (as measured by ARES Rheotens) and improved low shear rate viscosity, without sacrificing extrudability, and while retaining critical solid state performance properties.

Representative Polymer Synthesis:

The catalyst used was UCAT™-B300, a CrO catalyst, modified with a Ti(OR)$_4$ compound, and, in particular, a Ti(O-iPr)$_4$ compound. The UCAT™ is trademarked and is a property of Union Carbide Corporation and The Dow Chemical Company.

The polymerization took place in a single fluidized bed, gas phase reactor, with UCA™-B 300 catalyst, fed as a supported catalyst, or as a slurry catalyst, or in solution form. Oxygen was added to the reactor to adjust the melt flow properties, and to increase the comonomer incorporation. The $O_2/C_2$ flow ratios were in the range of 0.005-0.050 ppm. Reaction temperatures varied from 90 to 105° C. in the production of the resins. The H2/C2 ratio was in the range of 0.02 to 0.10. The C2 partial pressures were in the range of 75 to 275 psi. The C6/C2 ratios were in the range of 0.001 to 0.004 both reactors. The chrome productivity was in the range of 1 to 5,000,000 pounds per pound. Typical product particle sizes were as follows: average particle size of 0.020 to 0.045 inches (0.51 mm to 1.1 mm), with a bulk density in the range of 20-35 pounds per cubic foot. Fines were generally less than 9 weight percent through a 120 mesh screen, preferably less than 1 weight percent through a 120 mesh screen, and most preferably less than 0.5 weight percent through the 120 mesh screen. The polymer may be compounded with other additives, and was typically compounded with one or more stablizers, such as Irganox-010 and Iragos-168.

Product (Base Resin) Characterization:

Melt index of the product, as measured by MI21, was in the 5-20 g/10 min range. The density was in the 0.940-0.955 g/cc range. The molecular weight distribution, as measured by MI21/MI2, was in the 75 to 200 range, or in the "Mw/Mn" range of 7-25. Hexene was used as the comonomer. Polymerization conditions and base resin (random ethylene/1-hexene) properties are listed below.

| Polymerization Conditions | |
|---|---|
| Temperature ° C. | 99 |
| Total Pressure (psig) | 348 |
| Ethylene Partial Pressure (psi) | 249 |
| H2/C2 Molar Ratio | 0.05 |
| C6/C2 Molar Ratio | 0.0019 |
| O2/C2 Flow Ratio | 0.023 |
| Catalyst Feeder Rate (shot/min) | 1.0 |
| Superficial Gas Velocity (ft/sec) | 1.69 |
| Bed Weight (lbs) | 80.7 |
| Production Rate (lbs/hr) | 29.6 |
| Residence Time (hr) | 2.72 |
| Fluidized Bulk Density (lb/ft$^3$) | 19.1 |
| STY (lb/hr/ft$^3$) | 7.0 |
| Base Resin)Properties | |
| Reactor MI(I2) | 0.14 |
| Reactor MI (I5) | 0.66 |
| Reactor FI (I21) | 12.6 |
| Reactor MFR (I21/I2) | 92.6 |
| Reactor MFR (I21/I5) | 19.1 |
| Density (g/cc) | 0.9486 |
| Residual Cr | 0.28 |
| Settled Bulk Density (lb/ft$^3$) | 30.2 |
| APS (inch) | 0.037 |
| Fines (thru #120 Sieve) | 0.252 |

The polymer was post reactor azide coupled with DPO-BSA (4,4'-diphenyl oxide bis(sulfonyl azide)) in the form of a molecular melt (MM), and in the range of 50-200 ppm, or 25-200 ppm, DPO-BSA, with 75-125 ppm being the optimum level of DPO-BSA in the presence of the stabilization additives, such as Irganox-1010 and Irgafos-168.

Molecular Melt (MM) is the trade name of 3:1 eutectic blend/mixture of Irganox 1010 and DPO-BSA. Carbowax 400 in the 50-600 ppm range was added to retain color during the compounding of the resin. The MM was added as any other additive into the mixer. There are no gels formed, and neither the phenolic nor the phosphite additive is typically consumed. Final product had improved melt strength, compared to the incoming feedstock or unmodified pelleted product. Improved melt strength was measured via low shear rate rheology, Rheotens melt strength and extensional viscosity at 1, 10, 20 inch/inch/sec.

The "Molecular Melt (MM)" is the specific form of the azide coupling product received from the manufacturer. It is essentially a 1:3 molar ratio of BSA with Irganox 1010. This is not a physical mixture, but rather a co-precipitated blend. This blend is essentially a eutectic, whose melting point can be tuned over some range by preparing the product at different levels of crystallinity. A more full description of this blend can be found in U.S. Pat. No. 6,776,924, incorporated herein, in its entirety, by reference. Molecular melt is treated just like an additive and is added along with the other additives in the additive package at the manufacturing facility.

Azide coupling was conducted in a ZSK-30 extruder. Samples were then analyzed for basic resin characterization data and rheological properties. Thermoformed sheet were then made. Resin formulations are listed in Table 12.

Commercial Resin S (Comm. S) is a Solvay Fortiflex G50-100 resin (polyethylene-based copolymer with density of 0.952 g/cc, and a MI2 of 10.5 g/10 min). Commercial Resin M (Comm. M) is a Chevron-Phillips Marlex HXM 50-100 resin (polyethylene-based copolymer with density of 0.948 g/cc, and a MI2 of 10.0 g/10 min). Resin D5110 is a gas phase ethylene/1-hexene copolymer with density of 0.950 g/cc, and a MI2 of 10 g/10 min, and a MI2/MI5 of 22.5.

Representative extrusion conditions are listed in Table 13, and resin properties are listed in Table 14.

TABLE 12

| | | | Resin Formulations | | | | | | | |
|---|---|---|---|---|---|---|---|---|---|---|
| Base Resin | Comm. S | Comm. M | D5110 | Control | Ex. 1 | Ex. 2 | Ex. 3 | Ex. 4 | Ex. 5 | Ex. 6 |
| Resin (wt %) | 100 | 100 | 100 | 99.8 | 99.789 | 99.778 | 99.767 | 99.756 | 99.746 | 99.735 |
| I-1010 (wt %) | | | | 0.1 | 0.1 | 0.1 | 0.1 | 0.1 | 0.1 | 0.1 |
| I-168 (wt %) | | | | 0.1 | 0.1 | 0.1 | 0.1 | 0.1 | 0.1 | 0.1 |
| BSA MM (wt %)* | | | | | 0.011 | 0.022 | 0.033 | 0.044 | 0.054 | 0.065 |
| Total | 100 | 100 | 100 | 100 | 100 | 100 | 100 | 100 | 100 | 100 |

*BSA present at approximately 23 weight percent of the molecular melt

TABLE 13

| | Extruder Conditions for Azide Coupled Sheet | | | | | | |
|---|---|---|---|---|---|---|---|
| | Control | Ex. 1 25 ppm | Ex. 2 50 ppm | Ex. 3 75 ppm | Ex. 4 100 ppm | Ex. 5 125 ppm | Ex. 6 150 ppm |
| Zone #1 Temp (° C.) | 145/150 | 148 | 147 | 149 | 149 | 141 | 148 |
| Zone #2 Temp (° C.) | 200/200 | 200 | 200 | 200 | 199 | 199 | 200 |

TABLE 13-continued

Extruder Conditions for Azide Coupled Sheet

|  | Control | Ex. 1 25 ppm | Ex. 2 50 ppm | Ex. 3 75 ppm | Ex. 4 100 ppm | Ex. 5 125 ppm | Ex. 6 150 ppm |
|---|---|---|---|---|---|---|---|
| Zone #3 Temp (° C.) | 200/200 | 200 | 200 | 200 | 200 | 200 | 199 |
| Zone #4 Temp (° C.) | 220/220 | 220 | 220 | 220 | 220 | 220 | 220 |
| Zone #5 Temp (° C.) | 223/225 | 224 | 225 | 225 | 225 | 223 | 225 |
| Die Temp (° C.) | 230/230 | 230 | 230 | 230 | 230 | 230 | 230 |
| Melt Temp (° C.) | 227 | 227 | 226 | 227 | 227 | 227 | 227 |
| Extruder Torque % | 31 | 34 | 36 | 30 | 30 | 33 | 32 |
| Extruder RPM's | 151 | 151 | 151 | 151 | 152 | 151 | 151 |
| Die Pressure (psig) | 710 | 710 | 712 | 702 | 722 | 714 | 732 |
| Feeder # (Arbo) | 30 | 30 | 30 | 30 | 30 | 30 | 30 |
| Feeder #2 B2 | — | — | — | — | — | — | — |
| Feeder #3 (liquid) | — | — | — | — | — | — | — |
| Chopper Speed | 5 | 5 | 5 | 5 | 5 | 5 | 5 |
| Bath Temp (° F.) [° C.] | 53 [12] | 52 [11] | 54 [12] | 53 [12] | 53 [12] | 52 [11] | 56 [13] |
| Vent Open? | No | No | No | No | No | No | No |
| Output (lb/hr) [kg/h] | 10 [4.5] | 10 [4.5] | 10 [4.5] | 10 [4.5] | 10 [4.5] | 10 [4.5] | 10 [4.5] |
| Total lbs Collected [Kg] | 7 [3.2] | 7 [3.2] | 7 [3.2] | 7 [3.2] | 7 [3.2] | 7 [3.2] | 7 [3.2] |

TABLE 14

Resin Properties

|  | Comm. S | Comm. M | D5110 | Control | Ex. 1 | Ex. 2 | Ex. 3 | Ex. 4 | Ex. 5 | Ex. 6 |
|---|---|---|---|---|---|---|---|---|---|---|
| MI2 (g/10 min) | 0.063 | 0.0635 | 0.052 | 0.036 | 0.08 | 0.06 | 0.051 | 0.041 | 0.037 | 0.038 |
| MI5 (g/10 min) | 0.38 | 0.36 | 0.32 | 0.26 | 0.37 | 0.37 | 0.275 | 0.23 | 0.195 | 0.168 |
| MI10 (g/10 min) | 1.52 | 1.58 | 1.44 | 1.45 | 1.8 | 1.75 | 1.44 | 1.17 | 1.09 | 0.946 |
| MI21 (g/10 min) | 10.69 | 10.75 | 10.18 | 8.99 | 10.64 | 10.5 | 10 | 8.1 | 7.75 | 7.47 |
| MFR (MI21/MI2) | 169.7 | 169.3 | 195.8 | 249.7 | 133.0 | 175.0 | 196.1 | 197.6 | 209.5 | 196.6 |
| MFR (MI21/MI5) | 28.5 | 29.9 | 32.0 | 34.6 | 28.8 | 28.4 | 36.4 | 35.2 | 39.7 | 44.5 |
| MFR (MI10/MI2) | 24.2 | 24.9 | 27.8 | 40.3 | 22.5 | 29.2 | 28.2 | 28.5 | 29.5 | 24.9 |
| Density (g/cc) ASTM slow cooling | 0.9500 | 0.9490 | 0.9496 | 0.9500 | 0.9507 | 0.9504 | 0.9504 | 0.9504 | 0.9505 | 0.9508 |
| I-1010 | — | — | — | — | 797 | 944 | 955 | 1080 | 1109 | 1690 |
| I-168 Active | — | — | — | — | 567 | 523 | 489 | 466 | 431 | 678 |
| I-168 Inactive | — | — | — | — | 191 | 185 | 161 | 162 | 173 | 215 |
| I-168 Total | — | — | — | — | 758 | 708 | 650 | 628 | 604 | 893 |
| % I-168 Active | — | — | — | — | 74.8 | 73.9 | 75.2 | 74.2 | 71.4 | 75.9 |
| "S" ppm | — | — | — | — | 7.8 | 14 | 20 | 27 | 33 | 39 |
| Calculated Azide* | — | — | — | 0 | 39.7 | 71.2 | 101.7 | 137.4 | 167.9 | 198.4 |
| Rheotens Melt Strength (cN) at 190° C. |  |  |  | 20 | 18 | 19 | 22 | 26 | 31 | 36 |
| Rheotens velocity at failure (mm/sec) |  |  |  | 59 | 84 | 77 | 64 | 52 | 43 | 39 |

*Azide level calculated from "S" analysis, and represents the amount of BSA incorporated into the resin.

Resin viscosity data is shown in Table 15. The viscosity data taken at 100 sec$^{-1}$ shear rate simulates the viscosity of the resin during an extrusion. The viscosity data taken at 10$^{-4}$ sec$^{-1}$ shear rate simulates the sag resistance of the resin, for example, the sag resistance during a thermoforming process.

Based on the similar viscosities at a shear rate of 100 sec$^{-1}$, the coupled resins are expected to have similar extrudability, as that of the uncoupled control or commercial resin (Comm. S). In addition, based on the similar viscosities at a shear rate of 10$^{-4}$ sec$^{-1}$, the coupled resins are expected to have similar, or improved, sag resistance, as compared to the uncoupled control or commercial resin (Comm. S).

TABLE 15

Viscosity Data for Azide Coupled Resins

| Resin Description | Resin | Viscosity* at 10$^{-4}$ sec$^{-1}$ Times 10$^6$ | Viscosity** at 10$^2$ sec$^{-1}$ Times 10$^3$ |
|---|---|---|---|
| Control | Control | 0.92 | 2.15 |
| Example 1 | Coupled 1 | 1.41 | 2.12 |
| Example 2 | Coupled 2 | 1.59 | 2.16 |
| Example 3 | Coupled 3 | 1.71 | 2.12 |
| Example 4 | Coupled 4 | 1.79 | 2.06 |
| Example 5 | Coupled 5 | 2.05 | 2.11 |
| Example 6 | Coupled 6 | 1.96 | 1.99 |

TABLE 15-continued

Viscosity Data for Azide Coupled Resins

| Resin Description | Resin | Viscosity* at $10^{-4}$ sec$^{-1}$ Times $10^6$ | Viscosity** at $10^2$ sec$^{-1}$ Times $10^3$ |
|---|---|---|---|
| Comm. S | Commercial Resin | 1.93 | 1.75 |

*Viscosity determined from Creep measurements.
**Viscosity determined from Dynamic Mechanical Spectroscopy (DMS).

The resins were tested for strain at break. The stain at break is an indication of the thermoformability of the resin. The data is listed in Tables 16-23. The inventive resins have comparable or improved results over the control and commercial resins.

Samples exhibiting a larger strain at break (more extensible) can accommodate more extension in an extensional process. Resins having a higher extensional viscosity will have the ability to resist drawing behavior, and will have reduced thinning during an extensional portion of a process. Resins having lower viscosity (or elasticity G"/G') will flow better into mold cavities, and will be useful for filling out finer details of a mold. The coupled resins showed relatively little or no strain hardening. The coupled resins had improved extensibility and low viscosity, and thus, had improved thermoformability properties. These features, in addition to improved resistance to sag, make the inventive resins especially suitable for thermoforming processes.

The Hencky strain, sometimes referred to as true strain, is a measure of elongational deformation that applies to both polymer melts and solids. If an end-separation device such as an Instron tester is used, the Hencky strain can be calculated as $L(t)/L_0 - 1$, where $L_0$ is the initial length and $L(t)$ the length at time t. The Hencky strain rate is then defined as $1/L(t) \cdot dL(t)/dt$, and is constant only if the length of the sample is increased exponentially.

On the other hand, using an elongational device with a constant gauge length, such as the dual wind-up device of Sentmanat (described in U.S. Pat. No. 6,691,569, relevant portions incorporated herein by reference), a constant Hencky strain rate is simply obtained by setting a constant winding speed.

A SER (Sentmanat Extensional Rheometer) is a commercial version of the device described in U.S. Pat. No. 6,691,569. The SER consists of an attachment for a ARES control strain rheometer (TA Instruments, New Castle, Del. (USA)). The attachment fits inside the ARES environmental chamber, where temperature is controlled by a flow of hot nitrogen. Testing was carried out on strips, cut out of a 0.5 mm thick compression molded sheet. A constant Hencky strain rate was applied, and the time-dependent stress was determined from the measured torque and the sample time-dependent cross-section. The extensional viscosity, or uniaxial stress growth coefficient, was obtained by dividing the stress by the Hencky strain rate.

TABLE 16

Strain Data for the Control (Uncoupled)

| | Hencky Strain rate (s$^{-1}$) | | |
|---|---|---|---|
| | 20 | 10 | 1 |
| Extensional Viscosity (Pa s) | 81090 | 12430 | 306000 |
| Time (s) | 0.13 | 0.31 | 2.71 |
| Hencky Strain at Break (Hencky strain rate × time) | 2.6 | 3.1 | 2.71 |

TABLE 17

Strain Data for D5110

| | Hencky Strain Rate (s$^{-1}$) | | |
|---|---|---|---|
| | 20 | 10 | 1 |
| Extensional Viscosity (Pa s) | 50700 | 58660 | 137100 |
| Time (s) | 0.1 | 0.17 | 1.35 |
| Henvky Strain at Break (Hencky strain rate × time) | 2 | 1.7 | 1.35 |

TABLE 18

Strain Data for Commercial Resin S

| | Hencky Strain Rate (s$^{-1}$) | | |
|---|---|---|---|
| | 20 | 10 | 1 |
| Extensional Viscosity (Pa s) | 29700 | 76730 | 225800 |
| Time (s) | 0.07 | 0.2 | 1.89 |
| Hencky Strain at Break (Hencky strain rate × time) | 1.4 | 2 | 1.89 |

TABLE 19

Strain Data for Commercial Resin M

| | Hencky Strain Rate (s$^{-1}$) | | |
|---|---|---|---|
| | 20 | 10 | 1 |
| Extensional Viscosity (Pa s) | 29050 | 38570 | 87630 |
| Time (s) | 0.08 | 0.16 | 1.03 |
| Hencky Strain at Break (Hencky strain rate × time) | 1.6 | 1.6 | 1.03 |

TABLE 20

Strain Data for Example 1 (39.7 ppm azide)

| | Hencky Strain Rate (s$^{-1}$) | | |
|---|---|---|---|
| | 20 | 10 | 1 |
| Extensional Viscosity (Pa s) | 51740 | 48940 | 243700 |
| Time (s) | 0.1 | 0.16 | 2.52 |
| Hencky Strain at Break (Hencky strain rate × time) | 2 | 1.6 | 2.52 |

TABLE 21

Strain Data for Example 2 (71.2 ppm azide)

| | Hencky Strain Rate (s$^{-1}$) | | |
|---|---|---|---|
| | 20 | 10 | 1 |
| Extensional Viscosity (Pa s) | 36540 | 73700 | 143900 |
| Time (s) | 0.08 | 0.21 | 1.94 |
| Hencky Strain at Break (Hencky strain rate × time) | 1.6 | 2.1 | 1.94 |

TABLE 22

Strain Data for Example 3 (101.7 ppm azide)

| | Hencky Strain Rate (s$^{-1}$) | | |
|---|---|---|---|
| | 20 | 10 | 1 |
| Extensional Viscosity (Pa s) | 50720 | 49560 | 220200 |
| Time (s) | 0.08 | 0.12 | 1.34 |
| Hencky Strain at Break (Hencky strain rate × time) | 1.6 | 1.2 | 1.34 |

TABLE 23

Strain Data for Example 4 (137.4 ppm azide)

| | Hencky Strain Rate (s$^{-1}$) | | |
|---|---|---|---|
| | 20 | 10 | 1 |
| Extensional Viscosity (Pa s) | 39820 | 60700 | 171800 |
| Time (s) | 0.07 | 0.14 | 1 |
| Hencky Strain at Break (Hencky strain rate × time) | 1.4 | 1.4 | 1 |

Thermoform Sheet—Sag Results

Sheet samples were prepared from the D5110 resin, the Commercial M resin and an azide coupled resin (Example 3—scaled-up). Each resin was extruded into a sheet with the following dimensions: 24 inches wide, 36 inches long, and 0.120 inches thick. The sheet samples were prepared on a conventional sheet extrusion line using a 2.5" diameter extruder, with a length to diameter ratio of 30:1, and a 2-stage double wave style screw to plasticate the resin. A 26" wide extrusion die was used to form the extrudate into a molten sheet, and a horizontal 3 roll stand was used to size and cool the sheet.

The sheet samples were subsequently thermoformed on a ZMD International Model V223 shuttle thermoformer. Each sheet was placed in the clamp frame of the ZDM thermoformer, and rigidly clamped on all four sides. Next, the clamped sheet was indexed into the heat station of the ZMD thermoformer, where the sheet was heated by quartz infrared radiant heaters. As the temperature of the sheet increased, the sheet began to sag below the clamp frame. The distance of the sheet sag from the clamp frame was measured using an infrared profiling scanner (light curtain) that was positioned to detect sheet sag at the middle of the oven. The value of the sheet sag was recorded at the end of the heating cycle, and before the clamped frame was indexed out of the oven, and into the form station.

The results of sheet sag for sheets heated for 150 seconds in the oven are shown below in Table 24. The azide coupled resin exhibited lower sag than the D5110 resin and the Commercial M resin.

TABLE 24

| | Sheet sag | | |
|---|---|---|---|
| | D5110 | Comm. M | Azide Coupled (Example 3) |
| Average Measured Sag in inches (cm) | 2.5 (6.4) | 2.0 (5.1) | 1.5 (3.8) |

Surprisingly both the rheological kinematics of sag and extension demonstrate that the inventive coupled resins are more favorable for sheet-forming processes than the commercial product and the unmodified product control.

The azide coupled resins of Cr catalyzed resins have shown that the melt strength, as measured by sag, is improved to levels similar to, or better than, the control and commercial counterparts, while the extensibility, as measured via extensional viscosity, is maintained. In addition the viscosity shear rate response at high shear rates is very similar to the control and commercial resin control, such that extrudability should not be compromised. This means that inventive resins will possess both improved shear response (sag), without loosing extensional response, such that both rheological responses are improved over the competitive counterparts. This should translate to products that have favorable rheological performance in the sheet-thermoforming marketplace. Thus, products from this invention have preferred a combination of rheological properties for sheet and thermoforming applications. In the case of azide modification, improvements in both shear flow and extensional flow are unexpected, advantageous properties.

Conclusions—Coupled Cr Catalyzed Resins

Polymers for sheet and thermoforming require a balance of rheological properties. The balance is in both shear flow and extensional flow, since there are large and rapid shear and extensional deformations in the sheet and thermoforming process. Responses to large and rapid deformation depend on the size and rate of deformation and the kinematics of the deformation or the type of deformation. Thus, one can not measure the response in one type of deformation, and use this result to predict another deformation type. In this case, both shear and extensional flow measurements make significant contributions to the extrusion and thermoforming of the parts. Extensional flow is a deformational flow that involves stretching along streamlines, which is not the case in shear flows.

The azide coupled resins show improved sag resistance, in shear flow, as measured by viscosity at low shear rates. The coupled resins also maintained extrudability as measured by viscosity at 100 sec$^{-1}$ shear rates. In the extensional viscosity measurements, both viscosity and the strain rate are improved. This combination of improved sag resistance in shear flow, and improved viscosity and strain rate in extensional flows are unexpected, as these properties generally run counter to each other. Thus, resins from this invention have a particularly preferred combination of rheological properties for sheet and thermoforming applications. In the inventive resins, the improvements in both shear flow and extensional were unexpected results.

The uniqueness of the azide modification is that the technology works even on polymers that already have high melt strength, in comparison to other low melt strength polymers like polypropylene. The effect is a significant change in the low shear rate viscosity at 10$^{-4}$ or 10$^{-5}$ sec$^{-1}$ shear rate. The azide modification makes the Cr resins respond nearly equivalently to the competitive counterparts. In addition, there is no significant reduction in the active phosphite levels, so the products remain well stabilized in the presence of the coupling reactions.

Extruded sheet and thermoformed part surface smoothness is equivalent to the uncoupled resin. Extensional viscosity is improved over the competitive Marlex resin. Such viscosity is preferred in order to maintain part thickness during extension and during a thermoforming operation. The "Film Appearance Rating (FAR)" for these sheets is preferably zero or higher, more preferably ten or higher, and even more preferably 20 or higher.

What is claimed is:

1. An azide-modified composition, comprising the reaction product of:
   (a) a first composition comprising a LMW polyethylene component; and a HMW polyethylene component, and
   (b) a second composition comprising a coupling amount of at least one polysulfonyl azide, and
      wherein the first composition has a substantially single peak in an LTD (Lamellar Distribution Thickness) curve, and has an I5 from 0.01 to 0.5 g/10 min; and
      wherein the concentration of polysulfonyl azide is up to 200 µg/g, and
   wherein the azide-modified composition has a PENT (Pennsylvania Notch Test) value of greater than 1,000 hours at 80° C., and at an applied stress of 2.4 MPa, and
   wherein the azide-modified composition has a density greater than 0.940 g/cc, a flow rate ratio ($I_{21}/I_5$) from 15 to 50, and a viscosity at 0.01 sec$^{-1}$, 190° C., from 272,000 to 340,000 Pa·s, and
      wherein the LMW polyethylene component has a density from 0.955 to 0.980 g/cc, and is an ethylene homopolymer or an ethylene/C3-C10 aliphatic alpha-olefin copolymer; and
      wherein the HMW polyethylene component has a density from 0.920 to 0.932 g/cc, and is an ethylene homopolymer or an ethylene/C3-C10 aliphatic alpha-olefin copolymer, and
      where the HMW polyethylene component and the LMW polyethylene component are made in-situ, in one or more polymerization reactors, in the presence of one or more Ziegler-Natta catalyst systems.

2. The azide-modified composition of claim 1, wherein the composition has a PENT value of greater than 3,000 hours at 80° C. and 3 MPa.

3. The azide-modified composition of claim 1, wherein the composition has a PENT value of greater than 6,500 hours at 80° C. and 3 MPa.

4. The azide-modified composition of claim 1, wherein the HMW polyethylene component includes a comonomer selected from the group consisting of $C_3$ to $C_{10}$ alpha-olefins.

5. The azide-modified composition of claim 4, wherein the azide-modified composition has a melt viscosity, at a shear rate of $1\times10^{-5}$ rad/s, that is 5-fold greater than the melt viscosity of the composition without azide modification.

6. The azide-modified composition of claim 1, wherein the LMW polyethylene component includes a comonomer selected from the group consisting of $C_3$ to $C_{10}$ alpha-olefins.

7. The azide-modified composition of claim 6, wherein comonomer content ranges from greater than 0 to 3.0 wt percent.

8. The azide-modified composition of claim 1, wherein the first composition is bimodal as determined by GPC.

9. The azide-modified composition of claim 1, wherein the first composition is multimodal as determined by GPC.

10. The azide-modified composition of claim 1, wherein the HMW polyethylene component comprises from 48 to 67 percent by weight of the combined weight of the HMW component and the LMW component.

11. The azide-modified composition of claim 1, wherein the LMW polyethylene component comprises from 33 to 52 percent by weight of the combined weight of the HMW component and the LMW component.

12. The azide-modified composition of claim 1, wherein the first composition has a density greater than, or equal to, 0.940 g/cc.

13. A blow molded article comprising at least one component formed from the azide-modified composition of claim 1.

14. A pipe comprising at least one component formed from the azide-modified composition of claim 1.

15. The pipe of claim 14, wherein the pipe has a wall thickness of up to 4 inches (10.2 cm).

16. A film comprising at least one component formed from the azide-modified composition of claim 1.

17. The film of claim 16, wherein the composition is coupled with less than 150 µg/g of polysulfonyl azide.

18. The film of claim 16, wherein the film has higher dart impact strength, than a film made from an otherwise identical polymer composition that lacks a coupling agent.

19. The film of claim 16, wherein the film has a greater side-to-side bubble stability, than a film made from an otherwise identical polymer composition that lacks a coupling agent.

20. The film of claim 16, wherein the film has both a higher dart impact strength and a greater side-to-side bubble stability, than a film made from an otherwise identical polymer composition that lacks a coupling agent.

21. The blow molded article of claim 13, wherein the article has higher tensile impact and Izod impact values, and at least equal ESCR values, than a blow molded article made from an otherwise identical polymer composition that lacks a coupling agent.

22. The blow molded article of claim 13, wherein the article is a bottle, drum, or automotive part.

23. The azide-modified composition of claim 1, wherein the composition is coupled with less than 150 µg/g of polysulfonyl azide.

* * * * *